(12) United States Patent
Watanabe

(10) Patent No.: US 7,477,348 B2
(45) Date of Patent: Jan. 13, 2009

(54) RETARDER, LIQUID CRYSTAL DISPLAY ELEMENT, AND LIQUID CRYSTAL PROJECTOR

(75) Inventor: Shinya Watanabe, Tokyo (JP)

(73) Assignee: Sony Corporation, Tokyo (JP)

( * ) Notice: Subject to any disclaimer, the term of this patent is extended or adjusted under 35 U.S.C. 154(b) by 254 days.

(21) Appl. No.: 11/563,412

(22) Filed: Nov. 27, 2006

(65) Prior Publication Data

US 2007/0146595 A1 Jun. 28, 2007

(30) Foreign Application Priority Data

Nov. 28, 2005 (JP) ............................ P2005-341396

(51) Int. Cl.
*G02F 1/1335* (2006.01)
(52) U.S. Cl. ..................................... 349/117
(58) Field of Classification Search ................. 349/117, 349/118
See application file for complete search history.

(56) References Cited

U.S. PATENT DOCUMENTS 5,688,566 A * 11/1997 Broer et al. ................. 428/1.31

FOREIGN PATENT DOCUMENTS

JP 2004-191938 7/2004

* cited by examiner

*Primary Examiner*—Sarah Song
(74) *Attorney, Agent, or Firm*—Sonnenschein Nath & Rosenthal LLP

(57) ABSTRACT

A retarder includes a transparent support substrate, a prism layer including a plurality of microprisms arranged on one of main surfaces of the transparent support substrate, where each of the microprisms has a sloped prism face formed at the same slope angle with respect to the one main surface in the same direction, an optical anisotropic medium layer disposed on the sloped prism face so that an optic axis of the optical anisotropic medium layer is directed in one of a direction of the maximum sloped prism face of the microprisms and a direction perpendicular to the direction of the maximum sloped prism face, and a planarizing layer disposed on the transparent support substrate so as to embed the optical anisotropic medium layer therein. The planarizing layer is formed from a material having an index of refraction that is substantially the same as that of the microprisms.

16 Claims, 12 Drawing Sheets

EQUAL CONTRAST RATIO CONTOUR

EQUAL CONTRAST RATIO CONTOUR

CONTRAST RATIO
- 400.000
- 2000.000
- 1000.000
- 100.000
- 10.000

EQUAL CONTRAST RATIO CONTOUR

EQUAL CONTRAST RATIO CONTOUR

CONTRAST RATIO
- 400.000
- 2000.000
- 1000.000
- 100.000
- 10.000

RETARDER, LIQUID CRYSTAL DISPLAY ELEMENT, AND LIQUID CRYSTAL PROJECTOR

CROSS REFERENCES TO RELATED APPLICATIONS

The present invention contains subject matter related to Japanese Patent Application JP 2005-341396 filed in the Japanese Patent Office on Nov. 28, 2005, the entire contents of which are incorporated herein by reference.

BACKGROUND OF THE INVENTION

1. Field of the Invention

The present invention generally relates to a retarder, a liquid crystal display element, and a liquid crystal projector and, in particular, to a liquid crystal projector that has a compact body and that provides low light loss, high contrast, and high response speed by including a display element using an electric-field-controlled birefringence mode liquid crystal panel.

2. Description of the Related Art

Liquid crystal projectors are known that modulate light output from a light source using, for example, a transmissive liquid crystal display element so as to form light of an image and that project the light of an image onto, for example, a screen. Such liquid crystal projectors modulate light using liquid crystal display elements corresponding to R, G, and B primary colors and, subsequently, combines image light generated through the light modulation. Thus, the liquid crystal projectors can output a color image.

These known liquid crystal projectors employ a twisted nematic liquid crystal material as the liquid crystal display element. In recent years, a homeotropically-aligned electric-field-controlled birefringence mode liquid crystal display element has been used in order to increase the luminance, contrast, and resolution of the liquid crystal projectors. Additionally, in general, to increase the ease of manufacture, a transmissive liquid crystal display element is used for the liquid crystal projectors.

The homeotropically aligned liquid crystal display element can provide a significantly high contrast. However, when the homeotropically aligned liquid crystal display element is disposed in a liquid crystal projector, a strong electric field that is parallel to a substrate, known as a transverse electric field, occurs. This transverse electric field could disrupt the alignment directions of liquid crystal molecules, thus decreasing the light transmission efficiency.

To minimize the transverse electric field, a method has been proposed in which the polarity of the potential of an electrode is reversed between screen displays, known as a field reversing drive method. However, to perform this field reversing drive method, a large pixel potential capacitance is required for maintain the pixel potential for one field period. Accordingly, the aperture ratio of the pixel decreases, thus decreasing the light transmission efficiency.

Additionally, the above-described decrease in the light transmission efficiency of the liquid crystal display element makes the production of a high-resolution liquid crystal projector using this liquid crystal display element difficult.

In addition, a method for increasing the light transmission efficiency and the response speed of a liquid crystal display element has been proposed in which the non-uniform alignment directions of homeotropically aligned liquid crystal molecules due to the transverse electric field are controlled by controlling the pre-tilt angles of these liquid crystal molecules. However, in this method, a high contrast ratio, which is an advantage of the homeotropically aligned liquid crystal element, cannot be achieved, and therefore, the production of a transmissive liquid crystal projector using the homeotropically aligned liquid crystal element is difficult.

Accordingly, a structure is proposed in which a retardation unit composed of an optical anisotropic element is disposed between a liquid crystal element and a polarizer disposed on both sides of the liquid crystal element. In this case, the optical anisotropic element disposed between a first polarizer and the liquid crystal element or disposed between a second polarizer and the liquid crystal element is tilted at an angle in accordance with the alignment directions of liquid crystal molecules of the liquid crystal element. In such a structure, the light transmission efficiency can be improved while maintaining the high contrast ratio. In addition, the response speed can be increased (refer to, for example, Japanese Patent Application No. 2004-191938).

SUMMARY OF THE INVENTION

However, for liquid crystal projectors, the distances between the first polarizer and the liquid crystal element and between the second polarizer and the liquid crystal element are inherently limited. Thus, it is difficult to obtain spaces in which the optical anisotropic elements tilted at an angle are disposed.

Even when the spaces in which the optical anisotropic elements tilted at an angle are disposed can be obtained, the distance between the illumination optical system and the liquid crystal element or the distance between the liquid crystal element and the projection lens becomes long. Accordingly, the optical design may have to be changed significantly. In particular, if an optical anisotropic element tilted at an angle is disposed between the second polarizer and the liquid crystal element, the optical length between the liquid crystal element and the projection lens becomes long. Accordingly, the back focus of the projection lens needs to be increased. If the back focus of the projection lens is long, it becomes further difficult to obtain the desired image quality with the optical design. Furthermore, the diameter of the projection lens is increased, and therefore, the manufacturing cost of the projection lens is also increased and the size or the weight of the liquid crystal projector is increased.

Accordingly, the present invention provides a retarder capable of increasing the light transmission efficiency while maintaining a high contrast ratio of a transmissive liquid crystal display element and preventing the size of a projector using the liquid crystal display element from increasing. Furthermore, the present invention provides a compact liquid crystal display element and a compact projector using this retarder that can display a high-resolution image.

According to an embodiment of the present invention, a retarder includes a prism layer including a plurality of microprisms arranged on a transparent support substrate, an optical anisotropic medium layer, and a planarizing layer in this order. In the prism layer, each of the microprisms has a sloped prism face formed at the same slope angle with respect to the one main surface in the same direction. The optical anisotropic medium layer is disposed on the sloped prism face so that an optic axis of the optical anisotropic medium layer is directed in one of a direction of the maximum sloped prism face of the microprisms and a direction perpendicular to the direction of the maximum sloped prism face. The planarizing layer is disposed on the transparent support substrate so as to embed the optical anisotropic medium layer therein. The planarizing layer is formed from a material having an index of refraction that is substantially the same as that of the microprisms.

In the retarder having such a structure, the optical anisotropic medium layer disposed on the sloped prism face of each of the microprisms is formed at the same slope angle in the same direction and is disposed between the microprism and the planarizing layer having substantially the same index of refraction. Subsequently, the optical anisotropic medium layer is disposed on the transparent support substrate. Accordingly, the retarder including such an optical anisotropic medium layer has the same function as a retarder that includes a one-plate optical anisotropic medium layer tilted with respect to a light beam in a normal direction of the transparent support substrate. In addition, the retarder can be thinner in the direction of the optical axis of the incident light beam than a retarder including such a tilted one-plate optical anisotropic medium layer disposed in the optic axis direction or a direction perpendicular to the optic axis direction.

According to another embodiment of the present invention, a retarder includes a first prism layer disposed on one of main surfaces of a transparent support substrate and a second prism layer on the other main surface of the transparent support substrate with an optical anisotropic medium layer therebetween. The first prism layer and the second prism layer include microprisms arranged on the main surfaces and having a sloped prism face formed at the same slope angle with respect to the main surfaces in the same direction. The microprisms are formed from materials having substantially the same index of refraction. The sloped prism faces in each of the first prism layer and the second prism layer are parallel to each other. In addition, an optic axis of the optical anisotropic medium layer is directed in one of a direction of the maximum sloped prism face of the microprisms and a direction perpendicular to the direction of the maximum sloped prism face.

In such a retarder, the microprisms having sloped prism faces parallel to each other is disposed on one surface of the transparent support substrate and on the optical anisotropic medium layer disposed on the other surface of the transparent support substrate. Accordingly, when a light beam is incident in a normal direction of the transparent support substrate, the prism layer of the retarder on the input side inclines the optical axis of the light beam at a predetermined angle and makes the light beam be incident on the optical anisotropic medium layer. The prism layer disposed on the output side returns the direction of the optical axis of the light beam to the original direction and outputs the light beam. Consequently, the retarder has the same function as a retarder that includes a one-plate optical anisotropic medium layer tilted with respect to the optical axis of an incident light beam. In addition, the retarder can be thinner in the direction of the optical axis of the incident light beam than a retarder including such a tilted one-plate optical anisotropic medium layer.

According to yet another embodiment of the present invention, a liquid crystal display element includes a retarder having one of the above-described structures and disposed one of main surfaces of a liquid crystal panel, and a liquid crystal projector includes this liquid crystal display element.

As noted above, according to the retarder of the embodiment of the present invention, the retarder can have a structure that is thin in a direction of the optical axis of an incident light beam provided with retardation. Therefore, the liquid crystal display element including the retarder can maintain the compact size thereof while maintaining a high contrast ratio and improving the light transmission efficiency. As a result, a liquid crystal display element that can maintain the compact size thereof and display a high-resolution image and an excellent liquid crystal projector including the liquid crystal display element can be achieved.

DESCRIPTION OF THE PREFERRED EMBODIMENTS

Exemplary embodiments of the present invention are described with reference to the accompanying drawings. In the following exemplary embodiments, the structure of a retarder and a liquid crystal display element including the retarder are described first and, subsequently, a liquid crystal projector including the liquid crystal display element is described. In addition, similar numbering will be used for similar components in all the exemplary embodiments, and therefore, duplicated descriptions are not repeated.

First Exemplary Embodiment

Retarder

Figure 1A:
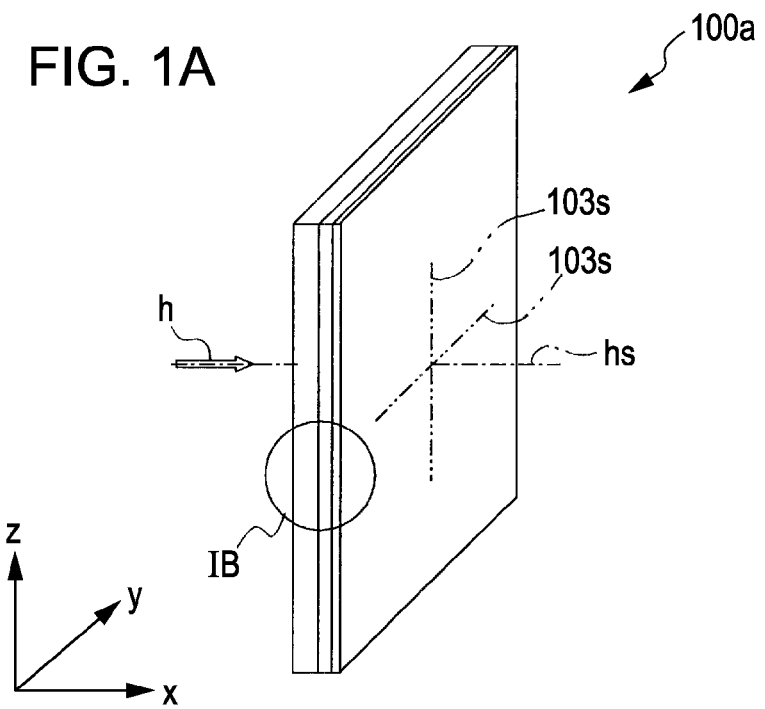
FIG. 1A is a perspective view of a retarder according to a first exemplary embodiment of the present invention.
Figure 1B:
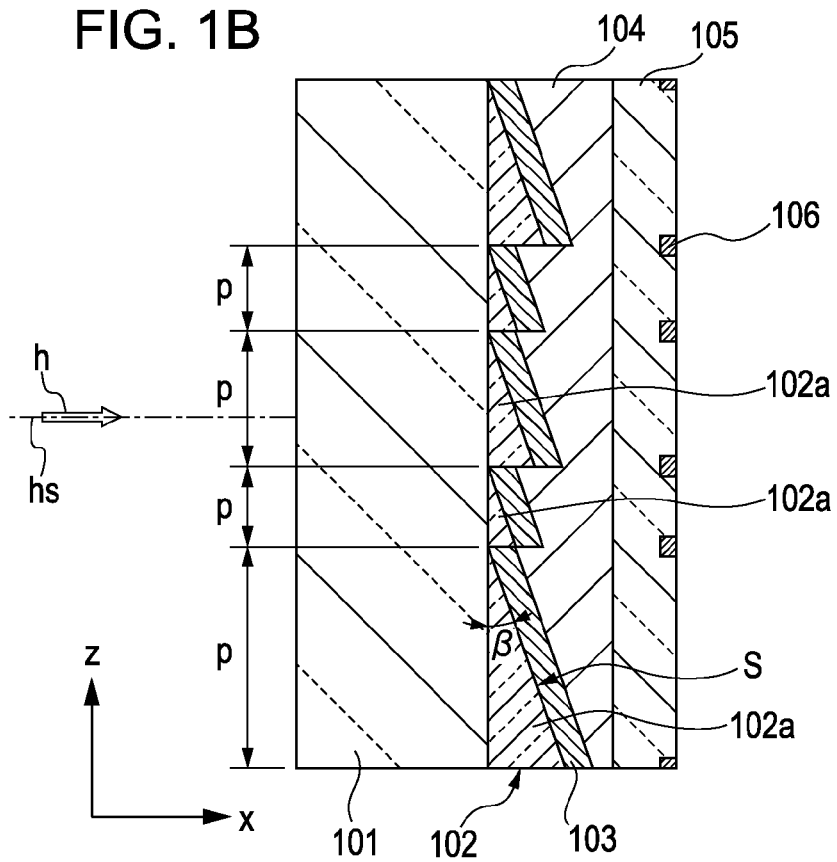
FIG. 1B is an enlarged cross-sectional view of a section denoted by IB in the perspective view of FIG. 1A.

FIG. 1A is a perspective view of a retarder according to a first exemplary embodiment of the present invention. FIG. 1B is an enlarged cross-sectional view of a section denoted by IB in the perspective view of FIG. 1A. A retarder 100a shown in FIGS. 1A and 1B is incorporated in a liquid crystal element which will be described below with reference to FIGS. 2 and 3 and serves as part of the liquid crystal element.

The retarder 100a includes a transparent support substrate 101, a prism layer 102 disposed on one of the main surfaces of the transparent support substrate 101, an optical anisotropic medium layer 103 disposed on the prism layer 102, a planarizing layer 104 for covering the optical anisotropic medium layer 103, and a cover glass 105.

The transparent support substrate 101 is formed from, for example, quartz. The transparent support substrate 101 has a thickness that can support the prism layer 102 disposed thereon (e.g., about 1 mm).

The prism layer 102 includes a plurality of microprisms 102a, each extending in the y direction shown in FIG. 1A or in the direction perpendicular to the plane of FIG. 1B. The microprisms 102a are formed from, for example, quartz. Each of the microprisms 102a has a sloped prism face S that slopes downward in a direction perpendicular to the extending direction of the microprism 102a. The sloped prism faces S of the microprisms 102a have the same slope angle (the prism apex angle β) with respect to the surface of the transparent support substrate 101. This slope angle, namely, the prism apex angle β is determined through a simulation or an exploratory experiment so that the desired retardation that maximizes the viewing angle of the liquid crystal display element including the retarder 100a can be obtained from the optical anisotropy provided by the index of refraction of the optical anisotropic medium layer 103, which will be described below, and the optical characteristics of a liquid crystal layer of the liquid crystal display element when a light beam passes through the optical anisotropic medium layer 103. In the present embodiment, for example, the prism apex angle β is set to 14°.

Additionally, each of the microprisms 102a extends in the direction perpendicular to the direction of the maximum slope of the sloped prism face S. The microprisms 102a are arranged in a direction perpendicular to the extending direction thereof without spaces therebetween. Pitches P of neighboring ones of the microprisms 102a in the arrangement are randomly different from each other in order to prevent the diffraction of a light beam passing through the neighboring microprisms 102a. In addition, the pitch P is determined to be a random integer multiple of a unit pitch. When the liquid crystal display element including the retarder 100a is assembled in a liquid crystal projector, it is desirable that this unit pitch is an integer multiple of the pixel pitch of the liquid crystal display element in order to prevent an adverse effect on the projection image caused by the borders between neighboring ones of the microprisms 102a. Accordingly, if the pixel pitch of the liquid crystal display element used in the following description is 12.5 μm, the unit pitch of the microprisms 102a is determined to be, for example, 12.5 μm×4=50 μm.

To manufacture the prism layer 102 including such microprisms 102a arranged therein, for example, a dry/wet etching method using a well-known photolithography technology, a glass molding technology, or a 2P method is used. For example, a film of a material having a different etching speed depending on the crystal orientation is used to generate the film so that a surface having a significantly slow etching speed becomes the sloped prism face S. In this case, the surface is formed so that the areas of the surface having a significantly slow etching speed are arranged at a random pitch. Thereafter, by etching this film from above, the etching process is stopped on the sloped prism face S. Thus, the prism layer 102 is generated.

The optical anisotropic medium layer 103 is formed as a negative uniaxial retardation film. For example, the optical anisotropic medium layer 103 is formed from a polystyrene polymer, an acrylic acid ester polymer, a methacrylic ester polymer, an acrylonitrile polymer, or a methacrylonitrile polymer. Alternatively, the optical anisotropic medium layer 103 may be formed from an inorganic dielectric multilayer film, such as a $Ti_2O_5$ or an $SiO_2$ film, which is suitable for a liquid crystal projector.

An optic axis 103s of the optical anisotropic medium layer 103 shown by a double-dashed chain line of FIG. 1A is parallel to the extending direction of the microprisms 102a. Alternatively, the optic axis 103s may be perpendicular to the extending direction of the microprisms 102a. That is, relative to the surface of the transparent support substrate 101, the optic axis 103s is tilted at an angle so that the direction of the optic axis 103s is the same as an azimuth direction of the maximum slope of the sloped prism face S of the microprisms 102a.

In addition, the optical anisotropic medium layer 103 on each of the microprisms 102a of the prism layer 102 has a uniform thickness. The optical anisotropic medium layer 103 can be formed using a well-known sputtering technique, evaporation technique, or coating technique. It should be noted that since the optical anisotropic medium layer 103 is formed on the sloped prism face S, the border portions between neighboring ones of the microprisms 102a cannot have a sharp shape. In such a case, to sharpen the border portion after the optical anisotropic medium layer 103 is formed, dry etching may be carried out.

The planarizing layer 104 is formed on the prism layer 102 so as to fill the irregularities formed by the prism layer 102 therewith. Thus, the planarizing layer 104 provides a planarized surface. In particular, it is important that the planarized surface of the planarizing layer 104 is parallel to the surface of the transparent support substrate 101. It is also important that the planarizing layer 104 is formed from a material having substantially the same index of refraction as the microprisms 102a, which is disposed on the opposite side of the optical anisotropic medium layer 103 from the planarizing layer 104. This is because the difference in the index of refraction between the optical anisotropic medium layer 103 and the planarizing layer 104 cancels the refractive angle of the incident light beam according to the Snell's law generated due to the difference in the index of refraction between the transparent support substrate 101 and the optical anisotropic medium layer 103. Accordingly, if the transparent support substrate 101 is composed of, for example, quartz, the planarizing layer 104 for the transparent support substrate 101 is composed of a silicon oxide. Quartz and silicon oxide have the same index of refraction n. For example, quartz and silicon oxide have the same index of refraction n=1.46 at a wavelength λ=550 nm of the incident light beam.

To form the planarizing layer 104, a planarizing material is coated on the prism layer 102 using a sputtering technique or an evaporation technique. Thereafter, the surface is planarized using a chemical mechanical polishing (CMP) technique, which is a well-known polishing technique.

The cover glass 105 is bonded to the surface of the planarizing layer 104 via an adhesive layer (not shown) in order to protect the prism layer 102 and the optical anisotropic medium layer 103 from being damaged due to the invasion of moisture and protect the surface of the planarizing layer 104 from being mechanically damaged. The cover glass 105 is composed of, for example, quartz.

Since the optical anisotropic medium layer 103 is formed on the sloped prism face S, the border portions between neighboring ones of the microprisms 102a cannot have a sharp shape. In this case, a light-shielding pattern 106 corresponding to the border portions between neighboring ones of the microprisms 102a may be formed on the cover glass 105. This light-shielding pattern 106 is formed on the surface of the cover glass 105 adjacent to the planarizing layer 104. However, the light-shielding pattern 106 may be formed on the surface of the planarizing layer 104 adjacent to the cover glass 105.

In the retarder 100a having such a structure, the optical anisotropic medium layers 103 provided on the sloped prism faces S of the microprisms 102a are tilted at the same angle (the prism apex angle β) in the same direction. Each of the optical anisotropic medium layers 103 is sandwiched between the prism layer 102 and the planarizing layer 104 having the same index of refraction and is disposed on the transparent support substrate 101. Accordingly, the retarder 100a including this optical anisotropic medium layer 103 can have the same function as a retarder including a one-plate optical anisotropic medium layer tilted with respect to an optical axis hs of the light beam h incident on the transparent support substrate 101 in the direction normal to the transparent support substrate 101. In addition, the retarder 100a can be thinner in the direction of the optical axis hs of the incident light beam h than the retarder including a tilted one-plate optical anisotropic medium layer.

Liquid Crystal Display Element

Figure 2:
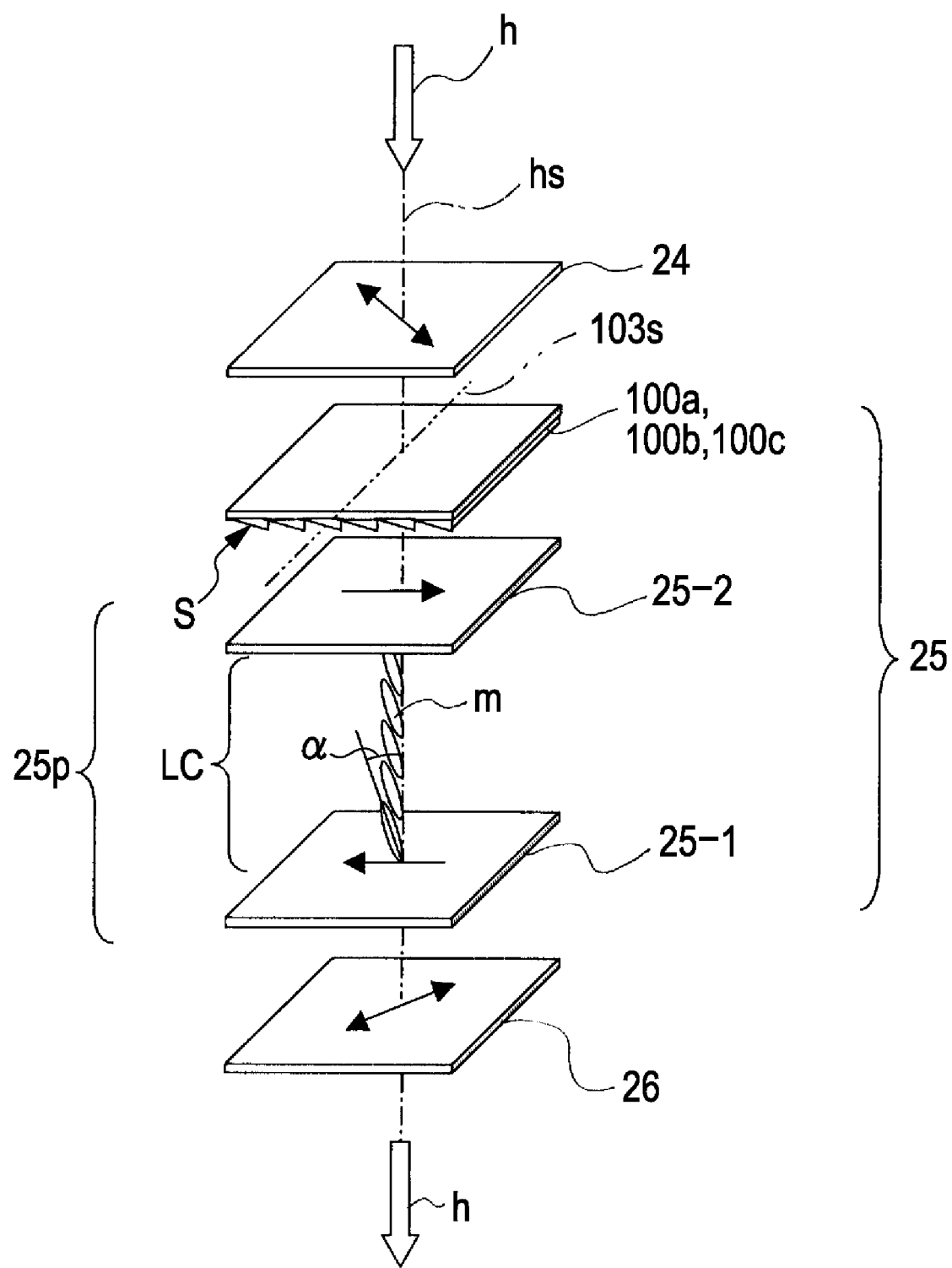
FIG. 2 illustrates the optical structure of a liquid crystal display element incorporating the retarder according to the first exemplary embodiment.
Figure 3:
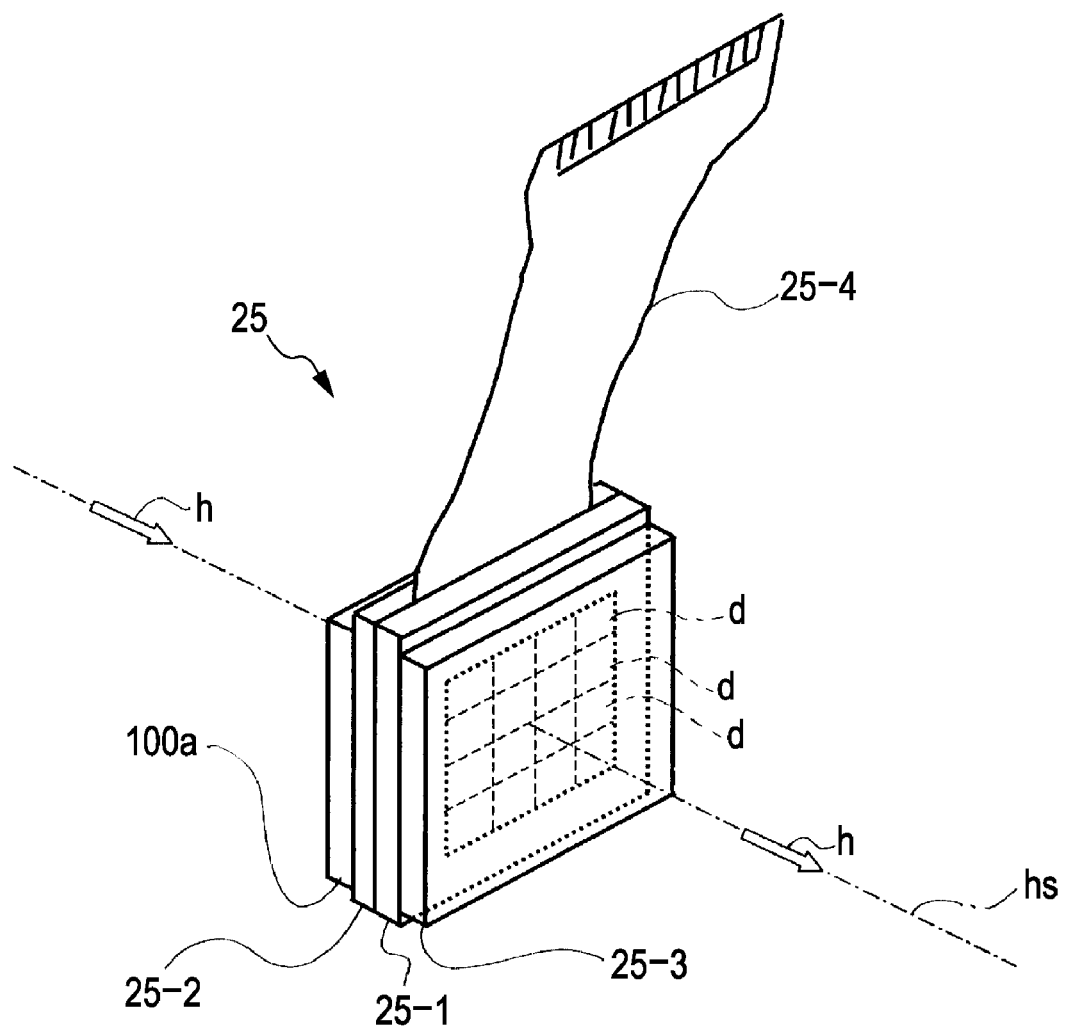
FIG. 3 illustrates the overall structure of the liquid crystal display element incorporating the retarder according to the first exemplary embodiment.

FIG. 2 illustrates an exemplary optical structure of a liquid crystal display element 25 incorporating the retarder 100a having the above-described structure. FIG. 3 illustrates the overall structure of the liquid crystal display element 25. The liquid crystal display element 25 shown in FIGS. 2 and 3 is included in a liquid crystal projector shown in FIG. 12, which will be described at the end of this specification. The liquid crystal display element 25 is disposed between an input polarizer 24 and an output polarizer 26 arranged in a crossed Nicols fashion.

The liquid crystal display element 25 includes a liquid crystal panel 25p in which a TFT substrate 25-1 and a counter substrate 25-2 seal therebetween a liquid crystal layer LC (shown in only FIG. 2). The retarder 100a is bonded to the outer surface of the counter substrate 25-2. The retarder 100a also functions as a dust-proof glass. A dust-proof glass 25-3 (shown in only FIG. 3) is bonded to the outer surface of the TFT substrate 25-1. The TFT substrate 25-1, the counter substrate 25-2, and the dust-proof glass 25-3 are formed from silica glass.

Pixel electrodes are disposed on the surface of the TFT substrate 25-1 adjacent to the liquid crystal layer LC. A homeotropic alignment layer (not shown) is formed on this surface so as to cover the pixel electrodes. The pixel electrodes are formed from transparent conductive thin films composed of, for example, ITO (indium tin oxide). Each of the pixel electrodes independently corresponds to one of pixels d arranged in a matrix. A flexible connector 25-4 (shown in only FIG. 3) is attached to the TFT substrate 25-1 so that a video electric signal can be delivered from the outside to the pixel electrodes.

A counter electrode is disposed on the surface of the counter substrate 25-2 adjacent to the liquid crystal layer LC. Additionally, a homeotropic alignment layer (not shown) is formed on this surface so as to cover the counter electrode. The counter electrode is formed from transparent conductive thin films composed of, for example, ITO. The counter electrode functions as a common electrode that is common to all the pixels d. As shown by arrows in FIG. 2, this homeotropic alignment layer is aligned in the direction parallel to and opposite that of the homeotropic alignment layer on the TFT substrate 25-1. In addition, a micolens (not shown) may be mounted on the counter substrate 25-2 for each of the pixels d in order to focus the incident light beam and increase the light transmission efficiency.

In the liquid crystal layer LC, the homeotropic alignment layer homeotropically aligns the liquid crystal molecules m at an angle of α with respect to a substrate normal direction, namely, the optical axis hs shown by a chain line in FIG. 2. Hereinafter, this angle α is referred to as a "pre-tilt angle". In this case, the liquid crystal molecules m align at a pre-tilt angle α in the alignment direction of the homeotropic alignment layers disposed on the TFT substrate 25-1 and the counter substrate 25-2. Here, the pre-tilt angle α is set to 12°, which is a typical setting value for the liquid crystal display element 25 used in three-panel transmissive liquid crystal display projectors. In the present embodiment, it is assumed that, by providing a strong alignment-regulating force to the liquid crystal molecules m having a pre-tilt angle of 12°, the liquid crystal molecules m maintain uniform alignments under any given transverse electric field. To obtain an alignment-regulating force to protect against the transverse electric field in a field reversing drive method, a pre-tilt angle of up to 20° is sufficient. Therefore, the pre-tilt angle α is set to a value in the range from 1° to 20°.

The retarder 100a having the structure illustrated in FIG. 1 is disposed on the counter substrate 25-2 with the sloped prism face S facing the counter substrate 25-2. Additionally, the retarder 100a is disposed so that the extending direction of the microprisms 102a is perpendicular to an azimuth direction in which the liquid crystal molecules m is tilted at the pre-tilt angle α (i.e., a pre-tilt direction). In this way, the optic axis 103s of the optical anisotropic medium layer 103 of the retarder 100a is perpendicular to or is made coincidence with the pre-tilt direction. The retarder 100a may be disposed so that the extending direction of the microprisms 102a is the same as the pre-tilt direction.

As described in the structure of the retarder 100a, the prism apex angle β of the microprism 102a in the retarder 100a is determined through a simulation so that the desired retardation that maximizes the viewing angle of the liquid crystal display element 25 can be obtained when the light beam h that is incident on the retarder 100a disposed as described above passes through the optical anisotropic medium layer 103.

Figure 4A:
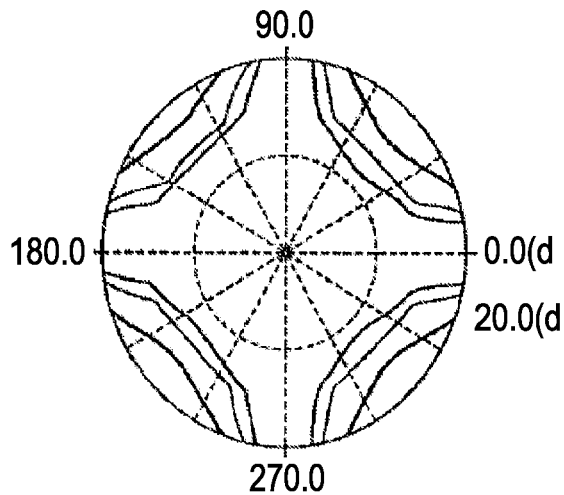
FIGS. 4A and 4B illustrate the results of simulation of a contrast characteristic of the liquid crystal display element.
Figure 4B:
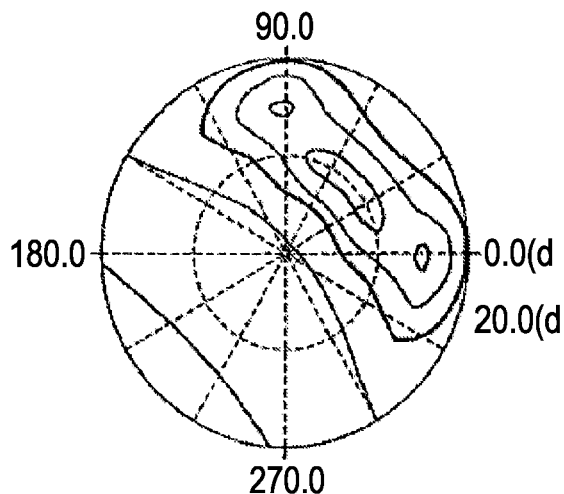
Figure 4B:
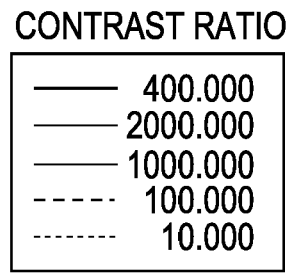

For example, suppose that the simulation or an exploratory experiment indicates that the optical anisotropic medium layer 103 provides a retardation value (Δnd) −427 nm for the light beam h that is perpendicularly incident and the optimal tilt angle of the optical anisotropic medium layer 103 for the liquid crystal panel 25p including the homeotropic liquid crystal layer LC with a pre-tilt angle of 12° is 14°, as shown in FIGS. 4A and 4B. Then, the prism apex angle β of the microprism 102a in the retarder 100a is determined to be 14°.

FIG. 4A illustrates the contrast when a liquid crystal display element in which a one-plate optical anisotropic medium layer that provides a retardation value (Δnd) −427 nm for the light beam h perpendicularly incident on the optical anisotropic medium layer is disposed so as to have a tilt angle of 14° with respect to a homeotropic liquid crystal layer LC with a pre-tilt angle α of 12°. The tilt direction and the optic axis direction of the optical anisotropic medium layer are the same as those of the present embodiment described in FIG. 2. In contrast, FIG. 4B illustrates the contrast when a liquid crystal display element without the optical anisotropic medium layer is used. The liquid crystal display elements used in this simulation include an input polarizer and an output polarizer arranged in a crossed Nicols fashion. Between the input polarizer and the output polarizer, a counter substrate is disposed so as to face the input polarizer while a TFT substrate is disposed so as to face the output polarizer. The TFT substrate and the counter substrate are disposed so that the alignment direction of the homeotropic alignment layers of the TFT substrate and the counter substrate has an angle of 45° with respect to the light transmission axis of the input polarizer and the output polarizer shown by an arrow in FIG. 2.

As can be seen from the comparison between FIG. 4A and FIG. 4B, by disposing the optical anisotropic medium layer at an angle of 14° with respect to a homeotropic liquid crystal layer LC, a contrast ratio greater than or equal to 2000:1 can be achieved at polar angles of greater than or equal to 10°, as shown in FIG. 4A. In addition, the ideal viewing angle characteristics can be achieved. In contrast, if the optical anisotropic medium layer is not provided, the region with a contrast ratio of 2000:1 is largely shifted from the center at polar angles of less than or equal to 20°, as shown in FIG. 4B. That is, since the liquid crystal molecules are tilted at a pre-tilt angle $\alpha$, the contrast ratio at a front view significantly decrease unless the effect of the pre-tilt angle $\alpha$ is eliminated. In addition, the viewing angle characteristics deteriorate at the same time.

When the contrast ratio of FIG. 4B is obtained by computation, a retardation value $\Delta$nd of the liquid crystal molecules is set to 427 nm. It is desirable that the absolute value of the retardation value $\Delta$nd of the optical anisotropic medium layer is the same as the absolute value of the retardation value $\Delta$nd of the liquid crystal molecules and the two retardation values $\Delta$nd have opposite signs. However, even when the two retardation values $\Delta$nd have an error of about ±50 nm, the error can be corrected. When a transmissive homeotropic liquid crystal display element is used, the design is made so that the retardation value $\Delta$nd ranges from 300 nm to 500 nm. In addition, the retardation value $\Delta$nd can be optimized for red light, green light, or blue light.

The above-described result of the simulation indicates that the contrast ratio can be increased if the optical anisotropic medium layer is disposed so as to have a tilt angle of 14°. In accordance with the angle of 14°, the prism apex angle $\beta$ of the microprisms 102a is determined to be 14°.

Additionally, as shown in FIG. 2, the liquid crystal display element 25 including the above-described retarder 100a is disposed between the input polarizer 24 and the output polarizer 26 arranged in a crossed Nicols fashion while either being bonded to these polarizers or simply sandwiched by these polarizers. At that time, the retarder 100a and the counter substrate 25-2 are disposed adjacent to the input polarizer 24 while the TFT substrate 25-1 is disposed adjacent to the output polarizer 26. The TFT substrate 25-1 and the counter substrate 25-2 are disposed so that the alignment direction of the homeotropic alignment layers of the TFT substrate 25-1 and the counter substrate 25-2 has an angle of 45° with respect to the light transmission axis of the input polarizer 24 and the output polarizer 26 shown by an arrow in FIG. 2.

In the liquid crystal display element 25 having the above-described structure, when passing through the liquid crystal layer LC, the light beam h that is incident in the direction normal to the surface of the substrate via the input polarizer 24 optically identifies whether the alignment of the liquid crystal molecules m in the liquid crystal layer LC is caused by the pixel electrode applied with a voltage or applied with no voltages. Thereafter, the light beam h is output from the output polarizer 26 to display the image.

The liquid crystal display element 25 having such a structure includes the optical anisotropic medium layer 103 disposed on the sloped prism faces S of the microprisms 102a of the retarder 100a. The optical anisotropic medium layer 103 is tilted at the prism apex angle $\beta$ with respect to the optical axis hs of the light beam h. Accordingly, when the light beam h passes through the optical anisotropic medium layer 103, the above-described desired retardation can be obtained. As a result, the liquid crystal projector can increase the light transmission efficiency and display a high-resolution image having a high contrast ratio.

In particular, the retarder 100a having the above-described structure allows the thickness of the substrate in the laminating direction (i.e., the optical axis direction of the light beam) to be decreased compared with a substrate including a retarder having a tilted one-plate optical anisotropic medium layer. Thus, the size of the liquid crystal display element 25 including the retarder 100a can be reduced.

In the above-described exemplary embodiment, the retarder 100a is disposed so that the sloped prism faces S are directed to the front surface of the counter substrate 25-2. However, the retarder 100a may be disposed on the counter substrate 25-2 so that the sloped prism faces S are directed to the incident side of the light beam. In this case, the counter substrate 25-2 may function as the transparent support substrate 101 of the retarder 100a. In addition, the retarder 100a may function as the dust-proof glass 25-3 for the TFT substrate 25-1. Even in this case, the sloped prism faces S of the retarder 100a may be directed to either an output side of the light beam h or the TFT substrate 25-1 side. However, in either case, the extending direction of the microprisms 102a is parallel or perpendicular to the pre-tilt direction of the liquid crystal molecules m of the liquid crystal layer LC.

In addition, when the liquid crystal display element 25 according to the present embodiment is used as a light modulation element (light valve) in three-panel transmissive liquid crystal display projectors, the pre-tilt angle $\alpha$ of the liquid crystal molecules m, in general, is set to 12°. However, even when the pre-tilt angle $\alpha$ is a value other than 12°, the liquid crystal display element 25 capable of improving the contrast ratio of the displayed image using a retarder can be made to be of reduced size by setting the prism apex angle $\beta$ of the microprisms 102a to the above-described optimal value.

Furthermore, the liquid crystal display element 25 according to the present invention is not limited to a liquid crystal display element including a homeotropic liquid crystal layer LC. The present embodiment can be applied to a liquid crystal display element including an ECB mode homogenious alignment liquid crystal layer. Even in this case, the liquid crystal display element 25 capable of improving the contrast ratio of the displayed image using a retarder can be made to be of reduced size.

Second Exemplary Embodiment

Retarder

Figure 5A:
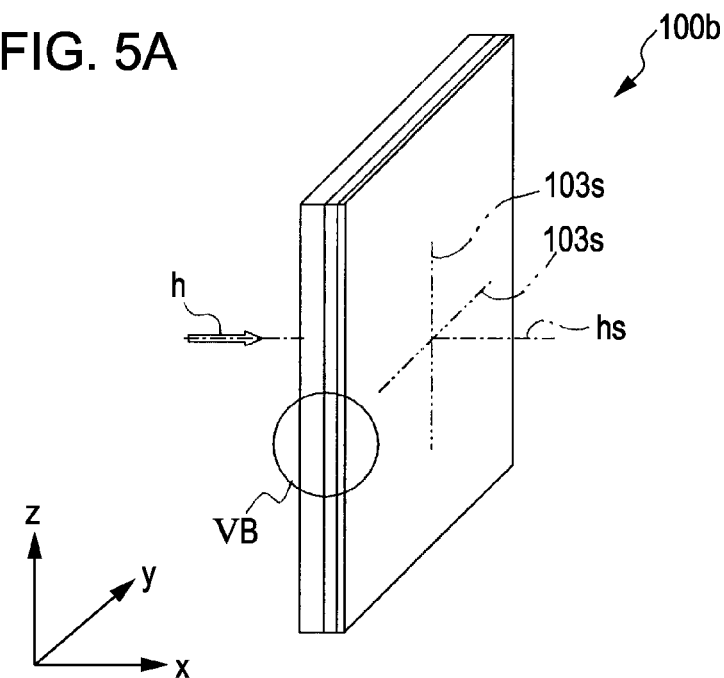
FIG. 5A is a perspective view of a retarder according to a second exemplary embodiment of the present invention.
Figure 5B:
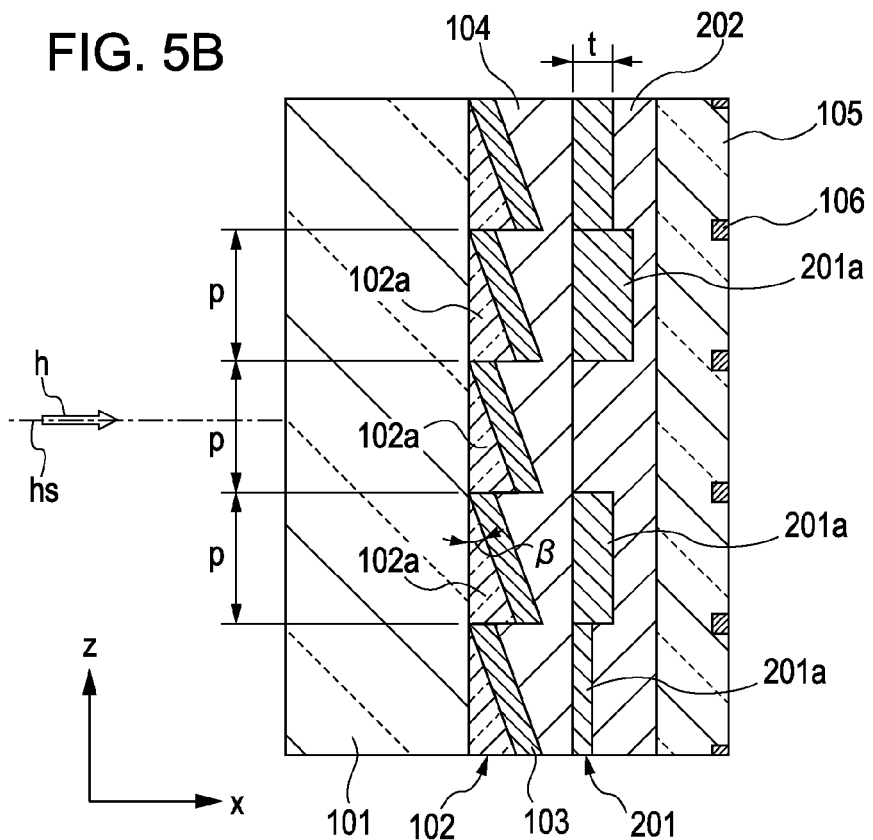
FIG. 5B is an enlarged cross-sectional view of a section denoted by VB in the perspective view of FIG. 5A.

FIG. 5A is a perspective view of a retarder according to a second exemplary embodiment of the present invention. FIG. 5B is an enlarged cross-sectional view of a section denoted by VB in the perspective view of FIG. 5A. A retarder 100b shown in FIGS. 5A and 5B is different from the retarder of the first exemplary embodiment in that the retarder 100b has a different structure of the prism layer 102 and further includes a random phase shifter layer 201 and a planarizing layer 202 between the planarizing layer 104 and the cover glass 105. The other structures of the second exemplary embodiment are similar to those of the first exemplary embodiment.

That is, the prism layer 102 includes a plurality of the microprisms 102a having the same cross section at the same pitch. Like the retarder 100a of the first exemplary embodiment shown in FIG. 1, the microprisms 102a is formed from, for example, quartz. The microprisms 102a have the same prism apex angle β. Each of the microprisms 102a has the sloped prism face S that slopes at the same slope angle. Furthermore, the pitch of the microprisms 102a is an integer multiple of the above-described unit pitch.

The random phase shifter layer 201 includes a plurality of phase shifters 201a, each protruding upwardly and extending in the same direction as that of the microprisms 102a. The phase shifters 201a are arranged at the same pitch as that of the microprisms 102a. To prevent a light beam passing through neighboring ones of the microprisms 102a arranged at the same pitch from being diffracted, thicknesses t of neighboring ones of the phase shifters 201a are randomly different from each other. The random phase shifter layer 201 having such a structure can be formed from, for example, silicon oxide (the index of refraction n=1.46 at λ=550 nm wavelength), which is the same material as that of the underlying planarizing layer 104.

To form the irregularities of the random phase shifter layer 201, a film is formed on the planarizing layer 104 using a sputtering technique, an evaporation technique, or a coating technique. Thereafter, the irregularities are formed on the film using a photolithographic technique, such as a dry/wet etching method or a 2P method. At that time, a resist mask having different thicknesses at positions corresponding to the thicknesses of the phase shifters is formed. By etching the film using this resist mask, the random phase shifter layer 201 including the phase shifters 201a having different thicknesses can be formed.

The planarizing layer 202 is formed from a material having an index of refraction different from that of the phase shifters 201a. For example, a resin having the index of refraction n=1.67 at λ=550 nm wavelength is used.

Even in the retarder 100b having such a structure, the optical anisotropic medium layers 103 formed on the sloped prism faces S of the microprisms 102a have the same tilt angle (prism apex angle β) in the same direction. In addition, the optical anisotropic medium layer 103 is sandwiched by the prism layer 102 and the planarizing layer 104 having substantially the same index of refraction and is disposed on the transparent support substrate 101. Accordingly, like the retarder 100a of the first exemplary embodiment, the retarder 100b can have the same function as a retarder including a one-plate optical anisotropic medium layer tilted with respect to an optical axis hs of the light beam h incident on the transparent support substrate 101 in the direction normal to the transparent support substrate 101. In addition, the retarder 100a can be thinner in the direction of the optical axis hs of the incident light beam h than the retarder including a tilted one-plate optical anisotropic medium layer.

Liquid Crystal Display Element

As described in FIG. 2 of the first embodiment, the retarder 100b having such a structure is assembled into the liquid crystal display element 25. Thus, like the liquid crystal display element including the retarder 100a of the first embodiment, the size of the liquid crystal display element 25 capable of improving the contrast using a retarder can be reduced.

Third Exemplary Embodiment

Retarder

Figure 6A:
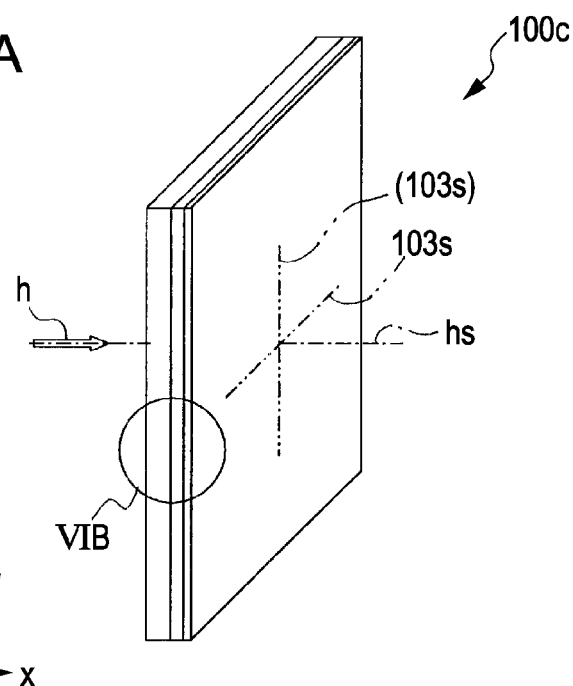
FIG. 6A is a perspective view of a retarder according to a third exemplary embodiment of the present invention.
Figure 6B:
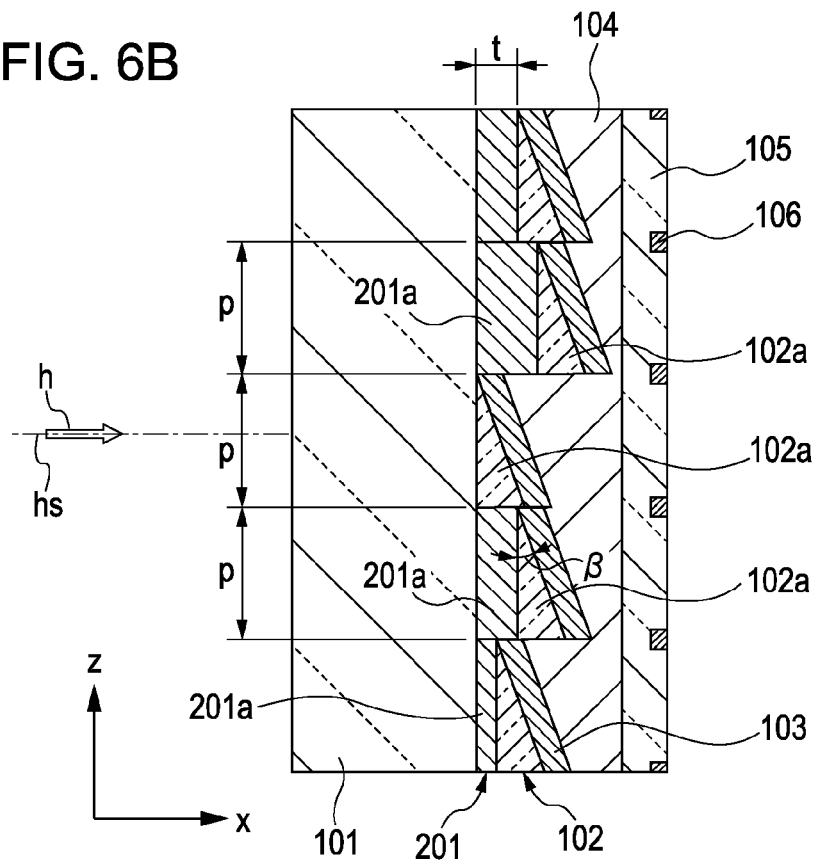
FIG. 6B is an enlarged cross-sectional view of a section denoted by VIB in the perspective view of FIG. 6A.

FIG. 6A is a perspective view of a retarder according to a third exemplary embodiment of the present invention. FIG. 6B is an enlarged cross-sectional view of a section denoted by VIB in the perspective view of FIG. 6A. A retarder 100c shown in FIGS. 6A and 6B is different from the retarder of the first exemplary embodiment in that the retarder 100c has a different structure of the prism layer 102 and further includes a random phase shifter layer 201 between the transparent support substrate 101 and the prism layer 102.

That is, the prism layer 102 has a structure similar to that described in FIG. 5. The microprisms 102a each having the same cross section are arranged in multiple lines at the same pitch.

A random phase shifter layer 201 has a structure similar to that of the random phase shifter layer 201 described in FIG. 5. A plurality of phase shifters 201a are arranged on the transparent support substrate 101 at the same pitch as that of the microprisms 102a. Additionally, to prevent the diffraction of a light beam passing through the microprisms 102a arranged at the same pitch, thicknesses t of neighboring ones of the phase shifters 201a are randomly different from each other.

The microprism 102a is provided on each of the phase shifters 201a. In this case, the random phase shifter layer 201 can be integrated into the prism layer 102.

Even in the retarder 100c having such a structure, the optical anisotropic medium layer 103 provided on the sloped prism face S of each of the microprisms 102a is disposed at the same angle (prism apex angle β) in the same direction. The optical anisotropic medium layers 103 are disposed between the microprisms 102a and the planarizing layer 104 having substantially the same index of refraction. These optical anisotropic medium layers 103, the microprisms 102a, and the planarizing layer 104 are disposed on the transparent support substrate 101. In this way, like the retarder 100a of the first embodiment, the retarder 100c can have the same function as a retarder including a one-plate optical anisotropic medium layer tilted with respect to an optical axis hs of the light beam h incident on the transparent support substrate 101 in the direction normal to the transparent support substrate 101. In addition, the retarder 100c can be thinner in the direction of the optical axis hs of the incident light beam h than the retarder including a tilted one-plate optical anisotropic medium layer.

Liquid Crystal Display Element

As described in FIG. 2 of the first embodiment, the retarder 100c having such a structure is assembled into the liquid crystal display element 25. Thus, like the liquid crystal display element including the retarder 100a of the first embodiment, the size of the liquid crystal display element 25 capable of improving the contrast using a retarder can be reduced.

Fourth Exemplary Embodiment

Retarder

Figure 7A:
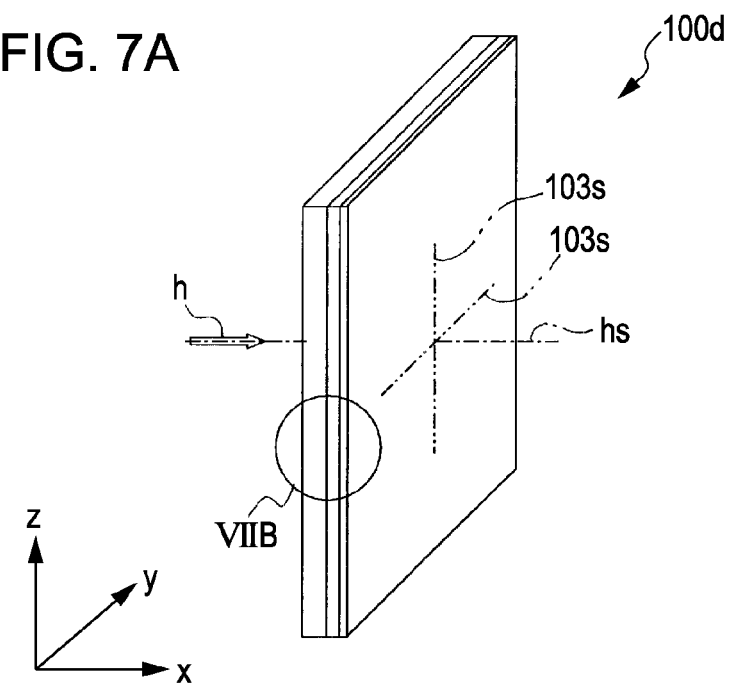
FIG. 7A is a perspective view of a retarder according to a fourth exemplary embodiment of the present invention.
Figure 7B:
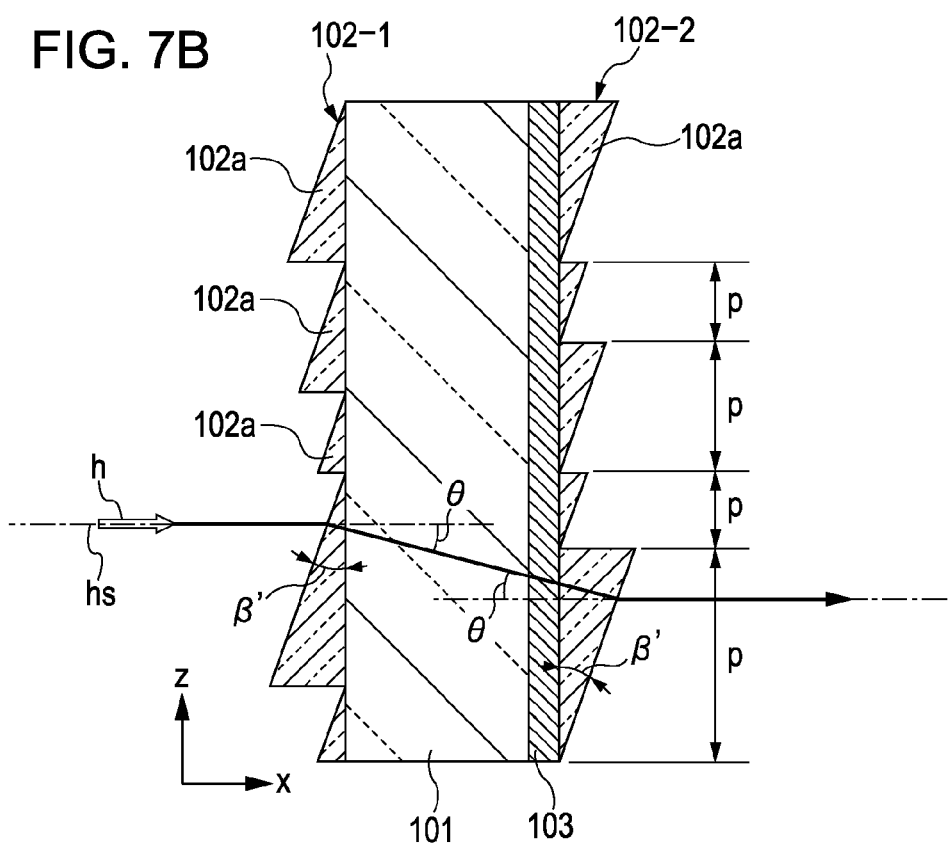
FIG. 7B is an enlarged cross-sectional view of a section denoted by VIIB in the perspective view of FIG. 7A.

FIG. 7A is a perspective view of a retarder according to a fourth exemplary embodiment of the present invention. FIG. 7B is an enlarged cross-sectional view of a section denoted by VIIB in the perspective view of FIG. 7A. A retarder 100d shown in FIGS. 7A and 7B is assembled into a liquid crystal display element which is described below with reference to FIGS. 8 and 9. Thus, the retarder 100d forms part of the liquid crystal display element.

Figure 8:
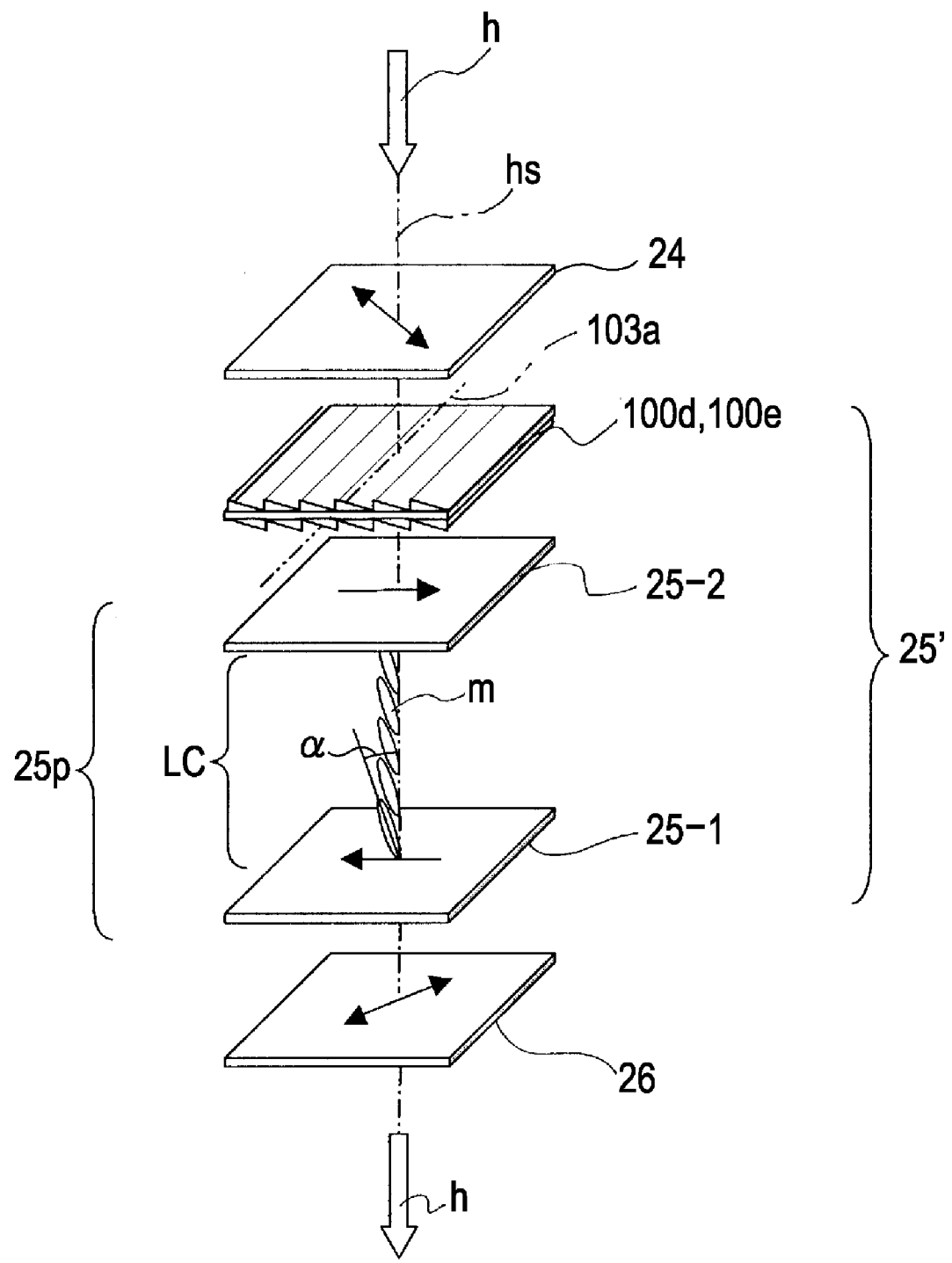
FIG. 8 illustrates the optical structure of a liquid crystal display element incorporating the retarder according to the fourth exemplary embodiment.
Figure 9:
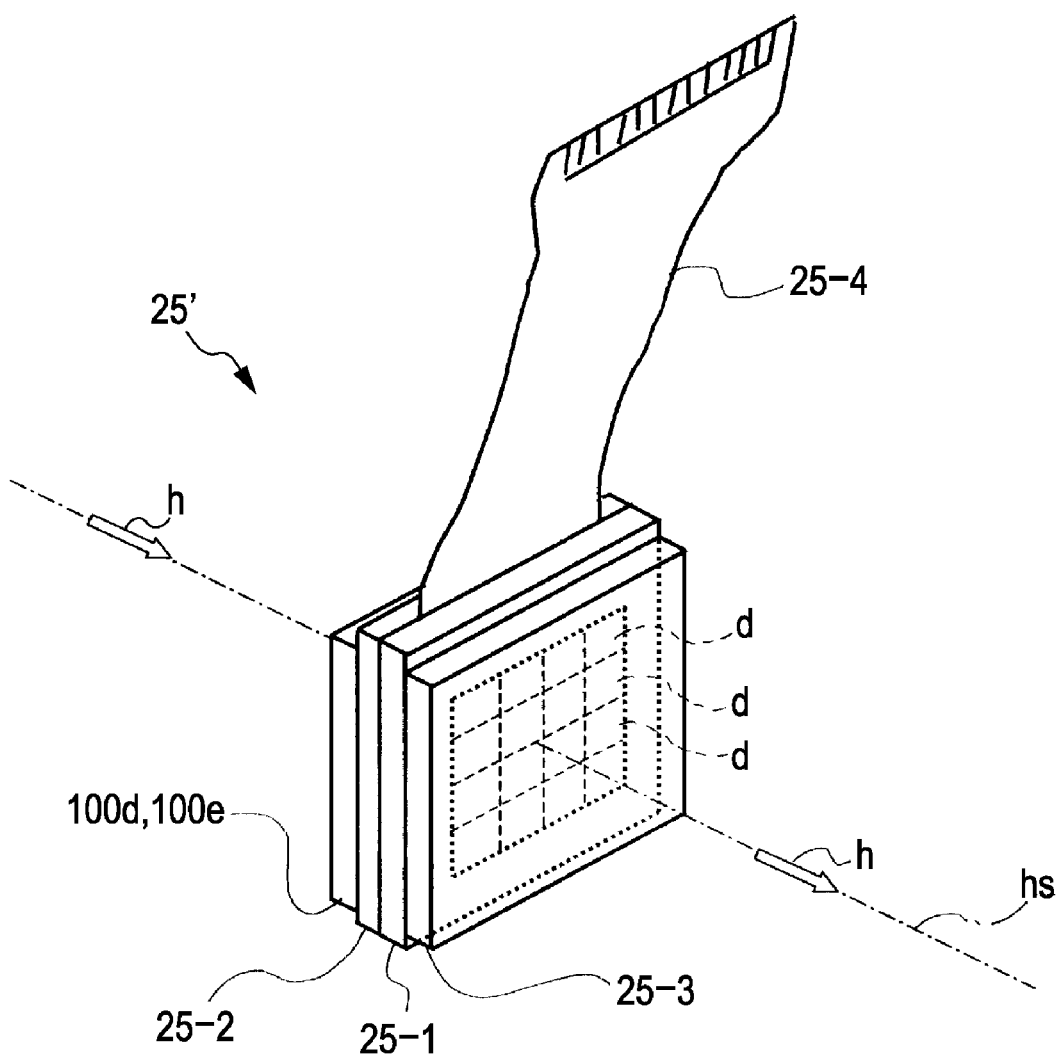
FIG. 9 illustrates the overall structure of the liquid crystal display element incorporating the retarder according to the fourth exemplary embodiment.

The retarder 100d shown in FIGS. 8 and 9 is different from the retarders of the above-described embodiments in that the retarder 100d has two prism layers. That is, the retarder 100d includes a transparent support substrate 101, an optical anisotropic medium layer 103 provided on one of the main surfaces of the transparent support substrate 101, a first prism layer 102-1 provided on the other main surface of the transparent support substrate 101, and a second prism layer 102-2 provided on the optical anisotropic medium layers 103.

The transparent support substrate 101 has the same structure as that described in the above-described embodiments. For example, the transparent support substrate 101 is formed from quartz. In addition, the transparent support substrate 101 has a thickness (e.g., about 1 mm) so as to support the first prism layer 102-1 and the second prism layer 102-2 formed thereon.

The optical anisotropic medium layer 103 is formed on the transparent support substrate 101 to be a flat film having a uniform thickness. Like the first embodiment, the optical anisotropic medium layer 103 is a negative uniaxial retardation film. For example, the optical anisotropic medium layer 103 is formed from a polystyrene polymer, an acrylic acid ester polymer, a methacrylic ester polymer, an acrylonitrile polymer, or a methacrylonitrile polymer. Alternatively, the optical anisotropic medium layer 103 may be formed from an inorganic dielectric multilayer film, such as a $Ti_2O_5$ or $SiO_2$ film, which is suitable for a liquid crystal projector.

An optic axis 103s of the optical anisotropic medium layer 103 shown by a double-dashed chain line of FIG. 7A is parallel to the extending direction of the microprisms 102a in the first prism layer 102-1 and the second prism layer 102-2. Alternatively, the optic axis 103s may be perpendicular to the extending direction of the microprisms 102a. That is, on the surface of the transparent support substrate 101, the optic axis 103s is tilted at an angle so that that the direction of the optic axis 103s is the same as the azimuth direction of the maximum slope of the sloped prism face S of the microprisms 102a.

Such an optical anisotropic medium layer 103 can be formed using a well-known sputtering technique, evaporation technique, or coating technique.

For example, the first prism layer 102-1 and the second prism layer 102-2 include the microprisms 102a each extending in the y direction of FIG. 7A or in the depth direction of the plane of FIG. 7B and arranged in multiple lines. Each of the microprisms 102a is formed from, for example, quartz. Each of the microprisms 102a has a sloped prism face S that slopes downward in a direction perpendicular to the extending direction of the microprism 102a. Like the first embodiment, the sloped prism faces S of the microprisms 102a have the same slope angle (the prism apex angle β') with respect to the surface of the transparent support substrate 101. The first prism layer 102-1 and the second prism layer 102-2 are disposed so that the sloped prism faces S thereof are mutually parallel.

This slope angle, namely, the prism apex angle β' is determined through a simulation or an exploratory experiment so that the desired retardation that maximizes the viewing angle of the liquid crystal display element including the retarder 100d can be obtained from the optical anisotropy provided by the index of refraction of the optical anisotropic medium layer 103, which will be described below, and the optical characteristics of a liquid crystal layer of the liquid crystal display element when a light beam passes through the optical anisotropic medium layer 103. In the present embodiment, for example, the prism apex angle β' is set to 40.2°.

Additionally, each of the microprisms 102a extends in the direction perpendicular to the direction of the maximum slope of the sloped prism face S. The microprisms 102a are arranged in a direction perpendicular to the extending direction thereof without spaces therebetween. Pitches P of neighboring ones of the microprisms 102a in the arrangement are randomly different from each other in order to prevent the diffraction of a light beam passing through the neighboring microprisms 102a. In addition, the pitch P is determined to be a random integer multiple of a unit pitch. When the liquid crystal display element including the retarder 100d is assembled in a liquid crystal projector, it is desirable that this unit pitch is an integer multiple of the pixel pitch of the liquid crystal display element in order to prevent an adverse effect on the projection image caused by the borders between neighboring ones of the neighboring microprisms 102a. Accordingly, if the pixel pitch of the liquid crystal display element used in the following description is 12.5 μm, the unit pitch of the microprisms 102a is determined to be, for example, 12.5 μm×4=50 μm.

As described above, the prism layer 102 including such microprisms 102a arranged therein is manufactured in the same manner as in the first embodiment.

In the retarder 100d having such a structure, the microprisms 102a are disposed with the transparent support substrate 101 and the optical anisotropic medium layer 103 therebetween so that the sloped prism faces S are mutually parallel. Therefore, in the retarder 100d, when the light beam h is incident on the first prism layer 102-1 (or the second prism layer 102-2) in the direction normal to the transparent support substrate 101, the first prism layer 102-1 (the second prism layer 102-2) tilts the optical axis hs of the light beam h at a predetermined angle θ and leads the light beam h onto the optical anisotropic medium layer 103. Subsequently, the second prism layer 102-2 (the first prism layer 102-1) returns the direction of the optical axis hs of the light beam h to the original direction and outputs the light beam h. Accordingly, the retarder 100d can have the same function as a retarder including a one-plate optical anisotropic medium layer tilted with respect to an optical axis hs of the light beam h incident on the transparent support substrate 101. In addition, the retarder 100d can be thinner in the direction of the optical axis hs of the incident light beam h than the retarder including a tilted one-plate optical anisotropic medium layer.

Liquid Crystal Display Element

FIG. 8 illustrates the optical structure of a liquid crystal display element 25' incorporating the retarder 100d having the above-described structure. FIG. 9 illustrates the overall structure of the liquid crystal display element 25'. The liquid crystal display element 25' shown in FIGS. 8 and 9 is included in a liquid crystal projector shown in FIG. 12, which will be described at the end of this specification. The liquid crystal display element 25' is disposed between an input polarizer 24 and an output polarizer 26 arranged in a crossed Nicols fashion.

The liquid crystal display element 25' includes a liquid crystal panel 25p in which a TFT substrate 25-1 and a counter substrate 25-2 seal in a liquid crystal layer LC (shown in only FIG. 8) therebetween. The retarder 100d is bonded to the outer surface of the counter substrate 25-2. The retarder 100d also functions as a dust-proof glass. A dust-proof glass 25-3 (shown in only FIG. 9) is bonded to the outer surface of the TFT substrate 25-1. The TFT substrate 25-1, the counter substrate 25-2, and the dust-proof glass 25-3 are formed from silica glass.

Pixel electrodes are disposed on the surface of the TFT substrate 25-1 adjacent to the liquid crystal layer LC. A homeotropic alignment layer (not shown) is formed on this surface so as to cover the pixel electrodes. The pixel electrodes are formed from transparent conductive thin films composed of, for example, ITO (indium tin oxide). Each of the pixel electrodes independently corresponds to one of pixels d arranged in a matrix. A flexible connector 25-4 (shown in only FIG. 9) is attached to the TFT substrate 25-1 so that a video electric signal can be delivered from the outside to the pixel electrodes.

A counter electrode is disposed on the surface of the counter substrate 25-2 adjacent to the liquid crystal layer LC. Additionally, a homeotropic alignment layer (not shown) is formed on this surface so as to cover the counter electrode. The counter electrode is formed from transparent conductive thin films composed of, for example, ITO (indium tin oxide). The counter electrode functions as a common electrode that is common to all the pixels d. As shown by arrows in FIG. 8, this homeotropic alignment layer is aligned in the direction parallel to and opposite that of the homeotropic alignment layer on the TFT substrate 25-1. In addition, a micolens (not shown) may be mounted on the counter substrate 25-2 for each of the pixels d in order to focus the incident light beam and increase the light transmission efficiency.

In the liquid crystal layer LC, the above-described homeotropic alignment layer homeotropically aligns the liquid crystal molecules m at an angle of $\alpha$ with respect to a substrate normal direction, namely, the optical axis hs shown by a chain line in FIG. 2. Hereinafter, this angle $\alpha$ is referred to as a "pre-tilt angle". In this case, the liquid crystal molecules m align at a pre-tilt angle $\alpha$ in the alignment direction of the homeotropic alignment layers disposed on the TFT substrate 25-1 and the counter substrate 25-2. Here, the pre-tilt angle $\alpha$ is set to 12°, which is a typical setting value for the liquid crystal display element used in three-panel transmissive liquid crystal display projectors. In the present embodiment, it is assumed that, by providing a strong alignment-regulating force to the liquid crystal molecules m having a pre-tilt angle of 12°, the liquid crystal molecules m maintain uniform alignments under any given transverse electric field. To obtain an alignment-regulating force to protect against the transverse electric field in a field reversing drive method, a pre-tilt angle of up to 20° is sufficient. Therefore, the pre-tilt angle $\alpha$ is set to a value in the range from 1° to 20°.

The retarder 100d having the structure illustrated in FIG. 7 is disposed so that the optical anisotropic medium layer 103 and the second prism layer 102-2 face the surface of the counter substrate 25-2 and the first prism layer 102-1 faces in the direction in which the light beam h enters. Additionally, the retarder 100d is disposed so that the extending direction of the microprisms 102a is perpendicular to an azimuth direction in which the liquid crystal molecules m is tilted at the pre-tilt angle $\alpha$ (i.e., a pre-tilt direction). In this way, the optic axis 103s of the optical anisotropic medium layer of the retarder 100d is perpendicular to or is made coincidence with the pre-tilt direction. The retarder 100d may be disposed so that the extending direction of the microprisms 102a is the same as the pre-tilt direction.

To bond the retarder 100d to the counter substrate 25-2, an adhesive agent may be applied to the entire surface of the second prism layer 102-2. Subsequently, this surface may be bonded to the counter substrate 25-2. Alternatively, an adhesive agent may be applied to the periphery of the surface of the second prism layer 102-2. Subsequently, this surface may be bonded to the counter substrate 25-2.

As mentioned in the foregoing description of the structure of the retarder 100d, the prism apex angle β' for the retarder 100d is determined through a simulation so that the desired retardation that maximizes the viewing angle of the liquid crystal display element 25' can be obtained when the light beam h incident on the retarder 100d disposed as described above passes through the optical anisotropic medium layer 103.

Figure 10A:
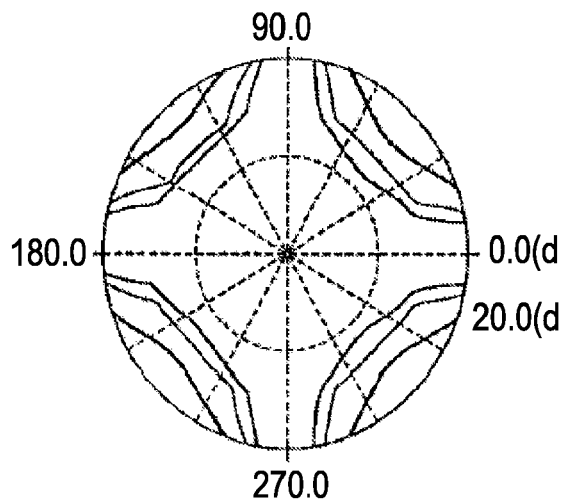
FIGS. 10A and 10B illustrate the results of simulation of a contrast characteristic of the liquid crystal display element.
Figure 10B:
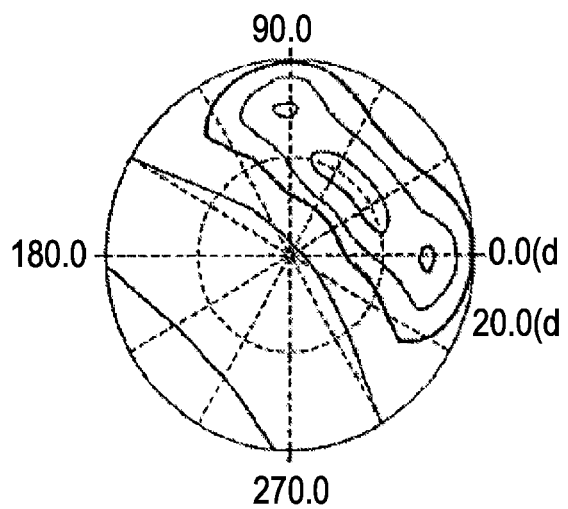
Figure 10B:
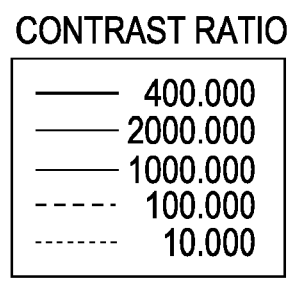

For example, suppose that the simulation or an exploratory experiment indicates that, as shown in FIGS. 10A and 10B, the optical anisotropic medium layer 103 provides a retardation value (Δnd) −427 nm for the light beam h that is perpendicularly incident and the optimal tilt angle θ of the optical anisotropic medium layer 103 for the liquid crystal panel 25p including the homeotropic liquid crystal layer LC with a pre-tilt angle of 12° is 14°. Then, the prism apex angle β' of the microprism 102a in the retarder 100d is determined to be the following value. That is, β'=40.3° can be obtained from the relational expression tan β'=n·sin θ/(n·cos θ−1). Here, n denotes the index of refraction of the material of the microprism 102a. In this embodiment, n=1.46 at λ (a wavelength of the light beam h)=550 nm.

FIG. 10A illustrates the contrast when a liquid crystal display element in which a one-plate optical anisotropic medium layer that provides a retardation value (Δnd) −427 nm for the light beam h perpendicularly incident on the optical anisotropic medium layer is disposed so as to have a tilt angle of 14° with respect to a homeotropic liquid crystal layer LC with a pre-tilt angle $\alpha$ of 12°. The tilt direction and the optic axis direction of the optical anisotropic medium layer are the same as those of the present embodiment described in FIG. 8. In contrast, FIG. 10B illustrates the contrast when a liquid crystal display element without the optical anisotropic medium layer is used. The liquid crystal display elements used in this simulation include an input polarizer and an output polarizer arranged in a crossed Nicols fashion. Between the input polarizer and the output polarizer, a counter substrate is disposed so as to face the input polarizer while a TFT substrate is disposed so as to face the output polarizer. The TFT substrate and the counter substrate are disposed so that the alignment direction of the homeotropic alignment layers of the TFT substrate and the counter substrate has an angle of 45° with respect to the light transmission axis of the input polarizer and the output polarizer shown by an arrow in FIG. 8.

As can be seen from the comparison between FIG. 10A and FIG. 10B, by disposing the optical anisotropic medium layer at an angle of 14° with respect to a homeotropic liquid crystal layer LC, a contrast ratio greater than or equal to 2000:1 can be achieved at polar angles of greater than or equal to 10°, as shown in FIG. 10A. In addition, the ideal viewing angle characteristics can be achieved. In contrast, if the optical anisotropic medium layer is not provided, the region with a contrast ratio of 2000:1 is largely shifted from the center at polar angles of less than or equal to 20°, as shown in FIG. 10B. That is, since the liquid crystal molecules are tilted at a pre-tilt angle $\alpha$, the contrast ratio at a front view significantly decrease unless the effect of the pre-tilt angle $\alpha$ is eliminated. In addition, the viewing angle characteristics deteriorate at the same time.

When the contrast ratio of FIG. 10B is obtained by computation, a retardation value Δnd of the liquid crystal molecules is set to 427 nm. It is desirable that the absolute value of the retardation value Δnd of the optical anisotropic medium layer is the same as the absolute value of the retardation value Δnd of the liquid crystal molecules and the two retardation values Δnd have opposite signs. However, even when the two retardation values Δnd have an error of about ±50 nm, the error can be corrected. When a transmissive homeotropic liquid crystal display element is used, the design is made so that the retardation value Δnd ranges from 300 nm to 500 nm. In addition, the retardation value Δnd can be optimized for red light, green light, or blue light.

The above-described result of the simulation indicates that the contrast ratio can be increased if the optical axis hs of the light beam h incident on the optical anisotropic medium layer is tilted at an angle of 14°. In accordance with the angle of 14°, the prism apex angle β' of the microprisms 102a is determined to be 40.3°.

Additionally, as shown in FIG. 8, the liquid crystal display element 25' including the above-described retarder 100d is disposed between the input polarizer 24 and the output polarizer 26 arranged in a crossed Nicols fashion while either being bonded to these polarizers or simply sandwiched by these polarizers. At that time, the retarder 100d and the counter substrate 25-2 are disposed adjacent to the input polarizer 24 while the TFT substrate 25-1 is disposed adjacent to the output polarizer 26. The TFT substrate 25-1 and the counter substrate 25-2 are disposed so that the alignment direction of the homeotropic alignment layers of the TFT substrate 25-1 and the counter substrate 25-2 has an angle of 45° with respect to the light transmission axis of the input polarizer 24 and the output polarizer 26 shown by an arrow in FIG. 8.

In the liquid crystal display element 25' having the above-described structure, when passing through the liquid crystal layer LC, the light beam h that is incident in the direction normal to the surface of the substrate via the input polarizer 24 optically identifies whether the alignment of the liquid crystal molecules m in the liquid crystal layer LC is caused by the pixel electrode applied with a voltage or applied with no voltages. Thereafter, the light beam h is output from the output polarizer 26 to display the image.

In the liquid crystal display element 25' having such a structure, the microprisms 102a are disposed on opposite sides of the transparent support substrate 101 of the retarder 100d having the optical anisotropic medium layer 103 disposed thereon on so that the sloped prism faces S of the microprisms 102a are mutually parallel. Accordingly, by setting the direction normal to the transparent support substrate 101 to the incident direction of the light beam h, the optical axis hs of the light beam h is incident on the transparent support substrate 101 at a predetermined tilt angle θ in the first prism layer 102-1 (or the second prism layer 102-2) disposed on the incident side. The second prism layer 102-2 (or the first prism layer 102-1) disposed on the output side returns the direction of the optical axis hs of the light beam h to the original direction and outputs the light beam h. Accordingly, when the light beam h passes through the optical anisotropic medium layer 103, the above-described desired retardation can be obtained. As a result, the liquid crystal projector can increase the light transmission efficiency and display a high-resolution image having a high contrast ratio.

In particular, the retarder 100d having the above-described structure allows the thickness of the substrate in the laminating direction (i.e., the optical axis direction of the light beam) to be decreased compared with a substrate including a retarder having a tilted one-plate optical anisotropic medium layer. Thus, the size of the liquid crystal display element 25' including the retarder 100d can be reduced.

In the above-described exemplary embodiment, the retarder 100d is disposed so that the optical anisotropic medium layer 103 and the second prism layer 102-2 face the front surface of the counter substrate 25-2. However, the retarder 100d may be disposed so that the first prism layer 102-1 faces the front surface of the counter substrate 25-2. In addition, the retarder 100d may function as the dust-proof glass 25-3 for the TFT substrate 25-1. Even in this case, the optical anisotropic medium layer 103 and the second prism layer 102-2 of the retarder 100d may be directed to either output side of the light beam h or the TFT substrate 25-1 side. However, in either case, the extending direction of the microprisms 102a is parallel or perpendicular to the pre-tilt direction of the liquid crystal molecules m of the liquid crystal layer LC.

In addition, when the liquid crystal display element 25' according to the present exemplary embodiment is used as a light modulation element (light valve) in three-panel transmissive liquid crystal display projectors, the pre-tilt angle α of the liquid crystal molecules m, in general, is set to 12°. However, even when the pre-tilt angle α is not 12°, the liquid crystal display element 25' capable of improving the contrast ratio of the displayed image using a retarder can be made to be of reduced size by setting the prism apex angle β' of the microprisms 102a to the above-described optimal value.

Furthermore, the liquid crystal display element 25' according to the present invention is not limited to a liquid crystal display element including a homeotropic liquid crystal layer LC. The present exemplary embodiment can be applied to a liquid crystal display element including an ECB mode homogenious alignment liquid crystal layer. Even in this case, the liquid crystal display element 25' capable of improving the contrast ratio of the displayed image using a retarder can be made to be of reduced size.

Fifth Exemplary Embodiment

Retarder

Figure 11A:
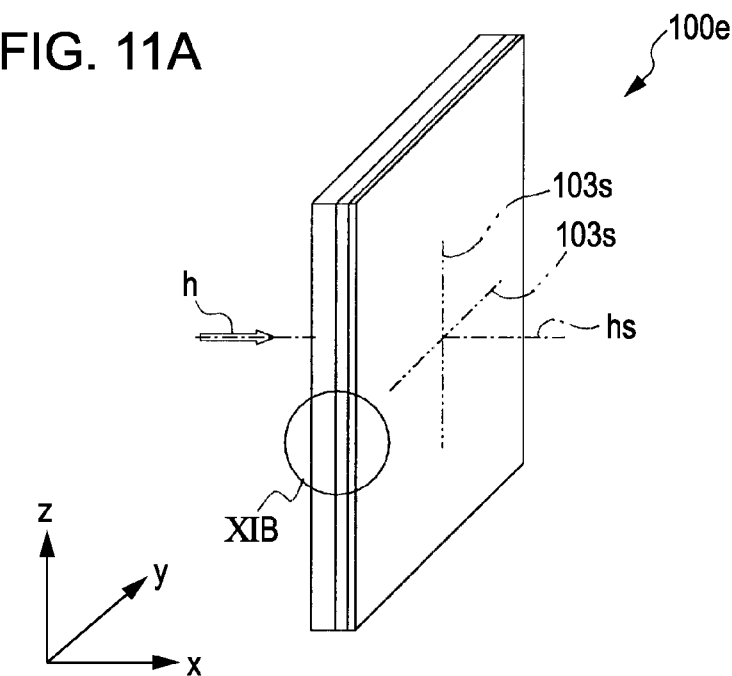
FIG. 11A is a perspective view of a retarder according to a fifth exemplary embodiment of the present invention.
Figure 11B:
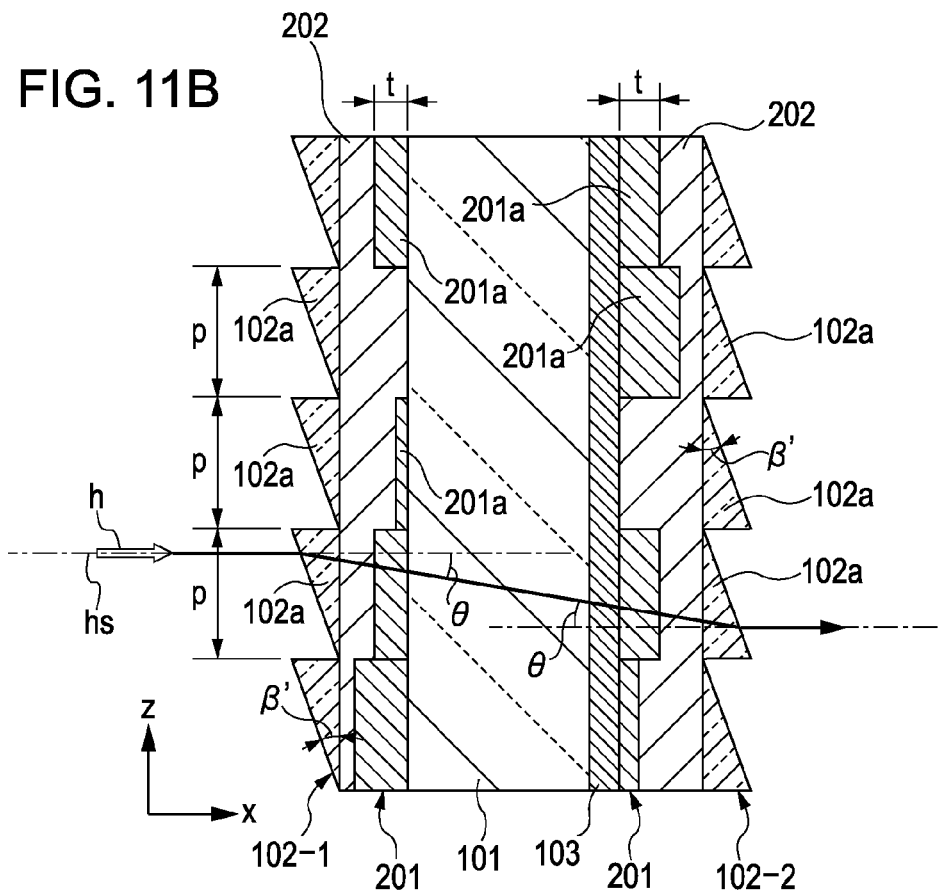
FIG. 11B is an enlarged cross-sectional view of a section denoted by XIB in the perspective view of FIG. 11A.

FIG. 11A is a perspective view of a retarder according to a fifth exemplary embodiment of the present invention. FIG. 11B is an enlarged cross-sectional view of a section denoted by XIB in the perspective view of FIG. 11A. A retarder 100e shown in FIGS. 11A and 11B is different from the retarder 100d of the fourth exemplary embodiment in that the retarder 100e has different structures of the prism layers 102-1 and 102-2 and includes a random phase shifter layer 201 and a planarizing layer 202 on the transparent support substrate 101 side of the prism layers 102-1 and 102-2. The other structures of the fifth exemplary embodiment are similar to those of the fourth exemplary embodiment.

That is, the prism layers 102-1 and 102-2 include the microprisms 102a having the same cross-section and arranged in multiple lines at the same pitch. Like the retarder 100d described in FIGS. 7A and 7B, the microprisms 102a are formed from, for example, quartz. The microprisms 102a have the same prism apex angle β' and have sloped prism faces S that slopes at the same angle. Furthermore, the pitch of the microprisms 102a is an integer multiple of the above-described unit pitch.

The random phase shifter layer 201 includes a plurality of phase shifters 201a, each protruding upwardly and extending in the same direction as that of the microprisms 102a. The phase shifters 201a are arranged at the same pitch as that of the microprisms 102a. To prevent a light beam passing through neighboring ones of the microprisms 102a arranged at the same pitch from being diffracted, thicknesses t of neighboring ones of the phase shifters 201a are randomly different from each other. The random phase shifter layer 201 having such a structure can be formed from, for example, silicon oxide (the index of refraction n=1.46 at λ=550 nm wavelength). The index of refraction of silicon oxide is the same as that of the transparent support substrate 101.

The random phase shifter layer 201 can be manufactured as in the second exemplary embodiment.

The planarizing layer 202 is formed from a material having an index of refraction different from that of the phase shifter 201a. For example, a resin having the index of refraction n=1.67 at λ=550 nm wavelength is used.

Even in the retarder 100e having such a structure, the microprisms 102a are disposed on opposite sides of the transparent support substrate 101 having the optical anisotropic medium layer 103 disposed thereon on so that the sloped prism faces S of the microprisms 102a are mutually parallel. Accordingly, like the fourth exemplary embodiment, the retarder 100e has the same function as that of a retarder including a one-plate optical anisotropic medium layer tilted with respect to the optical axis hs of the light beam h incident in the normal direction of the transparent support substrate 101. In addition, the retarder 100e can be thinner in the direction of the optical axis hs of the incident light beam h than the retarder including a tilted one-plate optical anisotropic medium layer.

Liquid Crystal Display Element

As described in the fourth exemplary embodiment with reference to FIG. 8, the retarder 100e having such a structure is assembled in the liquid crystal display element 25'. Thus, like the liquid crystal display element including the retarder 100d of the fourth embodiment, the liquid crystal display element 25' capable of improving the contrast ratio of the displayed image using a retarder can be of reduced size.

Liquid Crystal Projector

Figure 12:
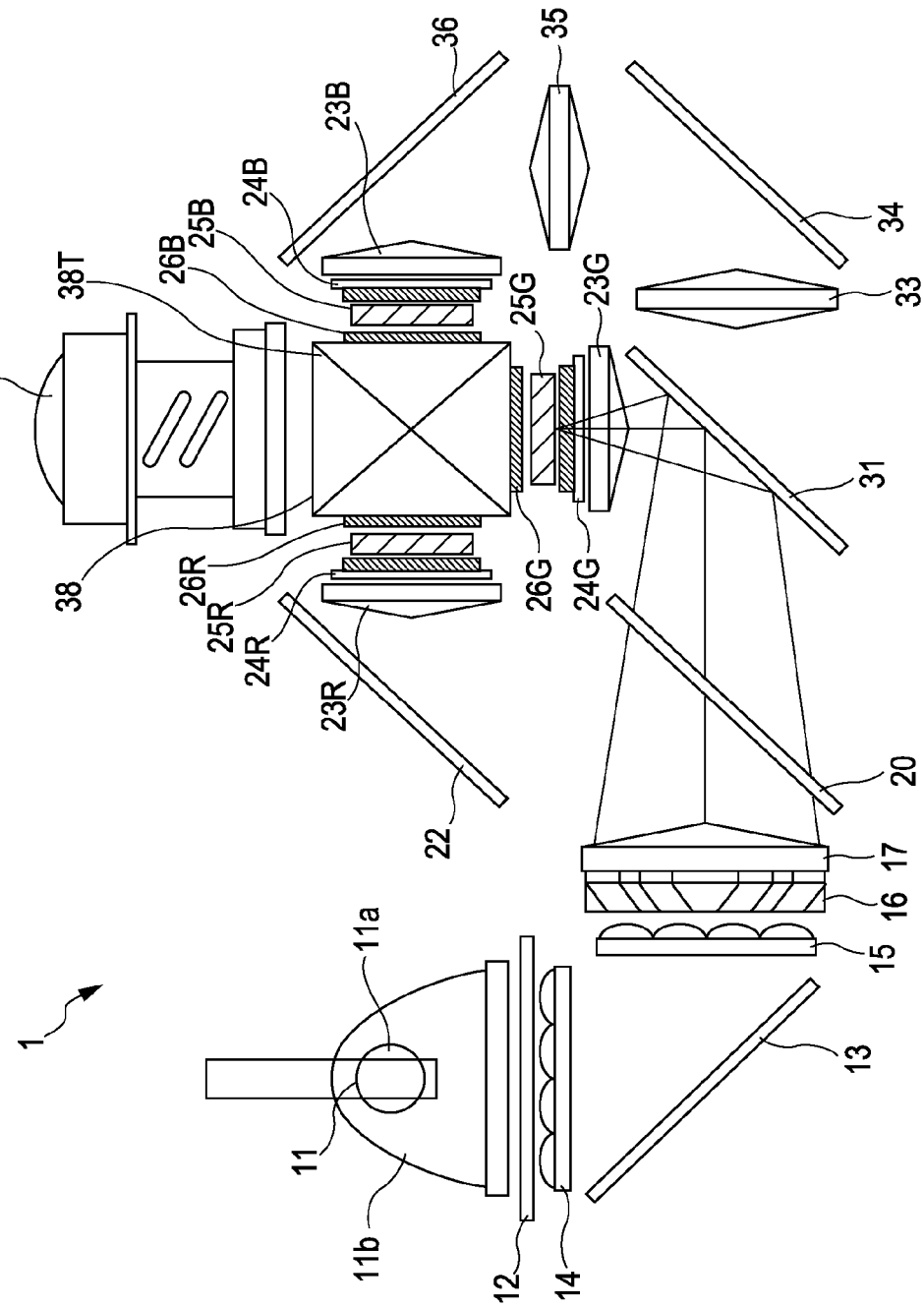
FIG. 12 illustrates an exemplary configuration of a liquid crystal projector according to the embodiments of the present invention.

FIG. 12 illustrates an exemplary configuration of a liquid crystal projector (three-panel transmissive liquid crystal projector) 1 including the liquid crystal display element 25 or 25' described with reference to FIG. 2 or 8.

The liquid crystal projector 1 projects an image onto an external screen. As shown in FIG. 12, the liquid crystal projector 1 includes a light source 11. The light source 11 further includes, in the following order along the optical path of the light emitted from the light source 11, a cut filter 12 for cutting out light outside the visible range, a first returning mirror 13 for reflecting light, a first multi-lens array 14, a second multi-lens array 15, a PS synthetic resin 16 for polarizing the light output from the second multi-lens array 15 in a predetermined polarization direction, a condenser lens 17 for collecting the light passing through the PS synthetic resin 16, and a first dichroic mirror 20 for separating the light in accordance with the wavelength range. The first multi-lens array 14 and the second multi-lens array 15 include a plurality of lens cells having a similar form with an aspect ratio of the effective aperture region of the liquid crystal display element 25.

The light source 11 can emit white light containing red light, green light, and blue light that are primary color light required for projecting a full-color image. The light source 11 includes a light emitter 11a for emitting the white light and a reflector 11b for reflecting the light emitted from the light emitter 11a. A gas discharge lamp including mercury vapor, for example, an ultra-high-pressure mercury discharge lamp is used for the light emitter 11a. The reflector 11b is a concave mirror whose mirror surface has a superior light-gathering ratio. Additionally, the reflector 11b has a rotationally symmetrical surface, such as a spheroidal surface of revolution or a paraboloidal surface of revolution.

The cut filter 12 is a planar mirror that removes light in an ultraviolet region contained in the white light emitted from the light source 11 by reflecting the light in an ultraviolet region. The cut filter 12 is formed by, for example, coating a film that reflects light in an ultraviolet region on a glass substrate. Thus, the cut filter 12 transmits light outside the ultraviolet region.

The first multi-lens array 14 and the second multi-lens array 15 transform the light into a light beam having a shape of an effective area of the liquid crystal display element 25 so as to illuminate the effective area of the liquid crystal display element 25 uniformly. Thus, the illumination distribution can be made to be uniform. The first multi-lens array 14 includes a plurality of small lens elements arranged in an array. The first multi-lens array 14 collects light reflected by the first returning mirror 13 using the lens elements so as to generate small point light sources. The second multi-lens array 15 combines the illumination light from the point light sources.

The condenser lens 17 is a convex lens. The condenser lens 17 adjusts the spot diameter of the light in a predetermined polarization direction controlled by the PS synthetic resin 16 so that the light is efficiently emitted into the effective aperture area of the liquid crystal display element 25.

The first dichroic mirror 20 is a wavelength selective mirror in which multiple dielectric films are coated on a main surface of a glass substrate (known as dichroic coating). The first dichroic mirror 20 separates red light to be reflected from light of the other colors (i.e., green light and blue light) to be transmitted.

That is, the first dichroic mirror 20 is disposed so as to be tilted at 45° with respect to a direction perpendicular to the optical path of the light output from the condenser lens 17. Therefore, the first dichroic mirror 20 transmits green light and blue light in the light output from the condenser lens 17 and reflects red light in a substantially vertical direction so as to change the propagation direction of the red light by 90°.

In addition, the liquid crystal projector 1 includes, in the following order along the optical path of the red light separated by the first dichroic mirror 20, a second returning mirror 22 for totally reflecting light, a first field lens 23R for collecting light, a first input polarizer 24R for transmitting only components of light in a predetermined polarization direction therethrough, a first liquid crystal display element 25R for spatially modulating light, and a first output polarizer 26R for transmitting only components of light in a predetermined polarization direction therethrough.

The second returning mirror 22 reflects the light reflected by the first dichroic mirror 20 in the horizontal direction so as to change the direction of the light by 90°. The second returning mirror 22 is disposed so as to be disposed at 45° in the vertical direction with respect to the optical path of the red light. Thus, the second returning mirror 22 emits the red light to the first field lens 23R.

The first field lens 23R is a condenser lens that forms an illumination optical system together with the condenser lens 17. The first field lens 23R outputs the red light reflected by the second returning mirror 22 to the first input polarizer 24R. Simultaneously, the first field lens 23R collects the red light onto the first liquid crystal display element 25R.

The first input polarizer 24R transmits only components of the red light output from the first field lens 23R in a predetermined polarization direction. The first input polarizer 24R is disposed so that the angle between the alignment direction of liquid crystal molecules on the surface of the input substrate of the first liquid crystal display element 25R and the transmission axis is 45°.

The first liquid crystal display element 25R is a transmissive panel using homeotropically aligned liquid crystal molecules. The homeotropically aligned liquid crystal molecules are enclosed between two transparent substrates (not shown). The first liquid crystal display element 25R having such a structure changes the state of the liquid crystal molecules in accordance with an input video signal corresponding to red video information so as to spatially modulate the red light input via the first input polarizer 24R and transmits the red light. Since the projected video image has a substantially rectangular shape whose side in the horizontal direction is longer than the side in the vertical direction, the first liquid crystal display element 25R has a substantially rectangular incidence plane.

The first output polarizer 26R transmits only components of the red light modulated by the first liquid crystal display element 25R in the polarization direction perpendicular to the first input polarizer 24R. The first output polarizer 26R is disposed so that the angle between the alignment direction of liquid crystal molecules on the surface of the output-side substrate of the first liquid crystal display element 25R and the transmission axis is 45°. Furthermore, the first output polarizer 26R is disposed so that the transmission axis of light of the first output polarizer 26R is perpendicular to that of the first input polarizer 24R, that is, the first output polarizer 26R is arranged in a crossed Nicols fashion with respect to the first input polarizer 24R.

Still furthermore, the liquid crystal projector 1 includes a second dichroic mirror 31 for separating incident light along the optical path of the light of the other color separated by the first dichroic mirror 20, that is, the optical path of blue light and green light in accordance with the wavelength range of the incident light.

The second dichroic mirror 31 separates the incident light into blue light and the light of the other color (i.e., green light).

The second dichroic mirror 31 is disposed so as to be tilted at 45° in the vertical direction with respect to the optical path of the light incident from the first dichroic mirror 20. Therefore, the second dichroic mirror 31 transmits blue light of the light incident from the first dichroic mirror 20 and reflects green light towards the projection lens 41 so as to change the direction of the green light by 90°.

The liquid crystal projector 1 includes, in the following order along the optical path of the green light separated by the second dichroic mirror 31, a second field lens 23G for collecting light, a second input polarizer 24G for transmitting only the component of light in a predetermined polarization direction, a second liquid crystal display element 25G for spatially modulating light, and a second output polarizer 26G for transmitting only the component of light in a predetermined polarization direction.

These components from the second field lens 23G through the output polarizer 26G are arranged in the same manner as the above-described components from the first field lens 23R through the first output polarizer 26R. However, the second liquid crystal display element 25G changes the state of the liquid crystal molecules in accordance with an input video signal corresponding to green video information so as to spatially modulate the green light input via the second input polarizer 24G and transmits the green light.

In addition, the liquid crystal projector 1 includes, in the following order along the optical path of the blue light separated by the second dichroic mirror 31, a first relay lens 33 for adjusting a optical path length, a third returning mirror 34 for totally reflecting incident light, a second relay lens 35 for adjusting a optical path length, a fourth returning mirror 36 for totally reflecting incident light, a third field lens 23B for collecting light, a third input polarizer 24B for transmitting only the component of light in a predetermined polarization direction, a third liquid crystal display element 25B for spatially modulating light, and a third output polarizer 26B for transmitting only the component of light in a predetermined polarization direction.

The first relay lens 33 adjusts an optical path length together with the second relay lens 35. The first relay lens 33 leads the blue light separated by the second dichroic mirror 31 to the third returning mirror 34.

The third returning mirror 34 is a total reflection mirror that reflects the light from the first relay lens 33 in the horizontal direction and changes the direction of the light by 90°. The third returning mirror 34 is disposed so as to be tilted at 45° in the vertical direction with respect to the optical path of the blue light from the first relay lens 33. Accordingly, the third returning mirror 34 reflects the blue light from the first relay lens 33 towards the second relay lens 35.

The second relay lens 35 adjusts an optical path length together with the first relay lens 33. The second relay lens 35 leads the blue light reflected by the third returning mirror 34 to the fourth returning mirror 36.

Note that the length of the optical path of the blue light to the third liquid crystal display element 25B is longer than the length of the optical path of the red light to the first liquid crystal display element 25R or the length of the optical path of the green light to the second liquid crystal display element 25G. Accordingly, the first relay lens 33 and the second relay lens 35 correct the difference so that the blue light is appropriately led to and is focused on the third liquid crystal display element 25B.

The fourth returning mirror 36 is a total reflection mirror that reflects the light from the second relay lens 35 in the vertical direction and changes the direction of the light by 90°. The fourth returning mirror 36 is disposed so as to be tilted at 45° in the vertical direction with respect to the optical path of the blue light from the second relay lens 35. Accordingly, the fourth returning mirror 36 reflects the blue light from the second relay lens 35 towards the third field lens 23B.

The components from the third field lens 23B through the third output polarizer 26B are arranged in the same manner as the above-described components from the first field lens 23R through the first output polarizer 26R. However, the third liquid crystal display element 25B changes the state of the liquid crystal molecules in accordance with an input video signal corresponding to blue video information so as to spatially modulate the blue light input via the third input polarizer 24B and transmits the blue light.

In addition, the liquid crystal projector 1 includes a combining prism 38 at a position where the red light, the green light, and the blue light spatially modulated by the first liquid crystal display element 25R, the second liquid crystal display element 25G, and the third liquid crystal display element 25B and passing through the first output polarizer 26R, the second output polarizer 26G, and the third output polarizer 26B, respectively, intersect. The combining prism 38 combines these red light, green light, and blue light. The liquid crystal projector 1 further includes a projection lens 41 for projecting the combined light produced by the combining prism 38 to a screen.

The red light output from the first liquid crystal display element 25R and transmitted by the first output polarizer 26R is incident on the combining prism 38. In addition, the green light output from the second liquid crystal display element 25G and transmitted by the second output polarizer 26G is incident on the combining prism 38. Furthermore, the blue light output from the third liquid crystal display element 25B and transmitted by the third output polarizer 26B is incident on the combining prism 38. The combining prism 38 combines the incident red, green, and blue light and outputs the combined light from an output surface 38T.

The projection lens 41 projects the combined light output from the output surface 38T of the combining prism 38 onto a screen while enlarging an image of the combined light.

In the above-described liquid crystal projector, the liquid crystal display element 25 (or 25') including the retarder mounted therein as described in the first to fifth embodiments is disposed between the input polarizer 24 and the output polarizer 26. At that time, each of the input polarizer 24, the liquid crystal display element 25 (25'), and the output polarizer 26 is disposed so that the optical axis of a light beam output from the field lens 23R, 23G, or 23B is normal to the surface of the substrate. Accordingly, a superior contrast characteristic of the projected image can be achieved. By assembling the liquid crystal display element 25 (25') in a liquid crystal projector, the thickness of the substrate in the optical axis direction can be reduced compared with a substrate including a liquid crystal panel with a retarder having a tilted one-plate optical anisotropic medium layer. Thus, the size of the liquid crystal projector can be reduced.

It should be understood by those skilled in the art that various modifications, combinations, sub-combinations and alterations may occur depending on design requirements and other factors insofar as they are within the scope of the appended claims or the equivalents thereof.

What is claimed is:

1. A retarder comprising:
   a transparent support substrate;
   a prism layer including a plurality of microprisms arranged on one of main surfaces of the transparent support substrate, each of the microprisms having a sloped prism face formed at the same slope angle with respect to the one main surface in the same direction;
   an optical anisotropic medium layer disposed on the sloped prism face so that an optic axis of the optical anisotropic medium layer is directed in one of a direction of the maximum sloped prism face of the microprisms and a direction perpendicular to the direction of the maximum sloped prism face; and
   a planarizing layer disposed on the transparent support substrate so as to embed the optical anisotropic medium layer therein, the planarizing layer being formed from a material having an index of refraction that is substantially the same as that of the microprisms.

2. The retarder according to claim 1, wherein the prism layer includes the microprisms arranged without spaces therebetween and each of the microprisms extends in a direction perpendicular to the direction of the maximum sloped prism face.

3. The retarder according to claim 2, wherein the prism layer includes the microprisms arranged at a random pitch.

4. The retarder according to claim 2, wherein the prism layer includes the microprisms arranged at the same pitch and wherein phase shifters having random film thicknesses are disposed on one of the prism layer adjacent to the transparent support substrate and the planarizing layer in the same arrangement as the microprisms.

5. The retarder according to claim 1, wherein the slope angle of the sloped prism faces of the microprisms is determined so that a light beam that is incident in a direction perpendicular to the surface of the transparent support substrate is output with a predetermined retardation.

6. The retarder according to claim 1, wherein a light-shielding pattern is formed at borders between the microprisms.

7. The retarder according to claim 1, wherein a cover glass is bonded on the planarizing layer.

8. A liquid crystal display element comprising:
   a liquid crystal panel including two transparent substrates with a liquid crystal layer sandwiched between electrode-forming surfaces of the two transparent substrates; and
   a retarder disposed on one of the surfaces of the liquid crystal panel, the retarder including a transparent support substrate, a prism layer including a plurality of microprisms arranged on one of main surfaces of the transparent support substrate, each of the microprisms having a sloped prism face formed at the same slope angle with respect to the one main surface in the same direction, a optical anisotropic medium layer disposed on the sloped prism face so that an optic axis of the optical anisotropic medium layer is directed in one of a direction of the maximum sloped prism face of the microprisms and a direction perpendicular to the direction of the maximum sloped prism face, and a planarizing layer disposed on the transparent support substrate so as to embed the optical anisotropic medium layer therein, the planarizing layer being formed from a material having an index of refraction that is substantially the same as that of the microprisms;
   wherein the retarder is disposed so that the optic axis of the optical anisotropic medium layer is directed in one of the pre-tilt direction of liquid crystal molecules of the liquid crystal layer and a direction perpendicular to the pre-tilt direction.

9. A liquid crystal projector comprising:
   a light source;
   an input polarizer and an output polarizer provided on an optical path of a light beam emitted from the light source;
   a liquid crystal display element disposed between the input polarizer and the output polarizer; and
   a projection lens for projecting the light beam modulated by the liquid crystal display element and output from the output polarizer;
   wherein the liquid crystal display element includes a liquid crystal panel including two transparent substrates with a liquid crystal layer sandwiched between electrode-forming surfaces of the two transparent substrates and a retarder disposed on one of the surfaces of the liquid crystal panel and wherein the retarder includes a transparent support substrate, a prism layer including a plurality of microprisms arranged on one of main surfaces of the transparent support substrate, each of the microprisms having a sloped prism face formed at the same slope angle with respect to the one main surface in the same direction, a optical anisotropic medium layer disposed on the sloped prism face so that an optic axis of the optical anisotropic medium layer is directed in one of a direction of the maximum sloped prism face of the microprisms and a direction perpendicular to the direction of the maximum sloped prism face, and a planarizing layer disposed on the transparent support substrate so as to embed the optical anisotropic medium layer therein, the planarizing layer being formed from a material having an index of refraction that is substantially the same as that of the microprisms, and wherein the retarder is disposed so that the optic axis of the optical anisotropic medium layer is directed in one of the pre-tilt direction of liquid crystal molecules of the liquid crystal layer and a direction perpendicular to the pre-tilt direction.

10. A retarder comprising:
    a transparent support substrate;
    a first prism layer including a plurality of microprisms arranged on one of main surfaces of the transparent support substrate, each of the microprisms having a sloped prism face formed at the same slope angle with respect to the one main surface in the same direction;
    an optical anisotropic medium layer disposed on the other main surface of the transparent support substrate so that an optic axis of the optical anisotropic medium layer is directed in one of a direction of the maximum sloped prism face of the microprisms and a direction perpendicular to the direction of the maximum sloped prism face; and a second prism layer including a plurality of microprisms arranged on the optical anisotropic medium layer, the microprisms having sloped prism faces parallel to each other, the microprisms being formed from a material having an index of refraction that is substantially the same as that of the microprisms of the first prism layer.

11. The retarder according to claim 10, wherein the first prism layer and the second prism layer include the microprisms arranged without spaces therebetween and each of the microprisms extends in the direction perpendicular to the direction of the maximum sloped prism face.

12. The retarder according to claim 11, wherein the first prism layer and the second prism layer include the microprisms arranged at a random pitch.

13. The retarder according to claim 11, wherein the first prism layer and the second prism layer include the microprisms arranged at the same pitch and wherein phase shifters having random film thicknesses are disposed at least on one of the transparent support substrate of the first prism layer and the optical anisotropic medium layer of the second prism layer in the same arrangement as the microprisms.

14. The retarder according to claim 10, wherein the slope angle of the sloped prism face of the microprisms is determined so that a light beam that is incident in a direction perpendicular to the surface of the transparent support substrate is output with a predetermined retardation.

15. A liquid crystal display element comprising:

a liquid crystal panel including two transparent substrates with a liquid crystal layer sandwiched between electrode-forming surfaces of the two transparent substrates; and a retarder disposed on one of the surfaces of the liquid crystal panel, the retarder including a transparent support substrate, a first prism layer including a plurality of microprisms arranged on one of main surfaces of the transparent support substrate, each of the microprisms having a sloped prism face formed at the same slope angle with respect to the one main surface in the same direction, an optical anisotropic medium layer disposed on the other main surface of the transparent support substrate so that an optic axis of the optical anisotropic medium layer is directed in one of a direction of the maximum sloped prism face of the microprisms and a direction perpendicular to the direction of the maximum sloped prism face, and a second prism layer including a plurality of microprisms arranged on the optical anisotropic medium layer, the microprisms having sloped prism faces parallel to the sloped prism faces of the microprisms of the first prism layer;

wherein the retarder is disposed so that the optic axis of the optical anisotropic medium layer is directed in one of the pre-tilt direction of liquid crystal molecules of the liquid crystal layer and a direction perpendicular to the pre-tilt direction.

16. A liquid crystal projector comprising:

a light source;

an input polarizer and an output polarizer provided on an optical path of a light beam emitted from the light source;

a liquid crystal display element disposed between the input polarizer and the output polarizer; and a projection lens for projecting the light beam modulated by the liquid crystal display element and output from the output polarizer;

wherein the liquid crystal display element includes a liquid crystal panel including two transparent substrates with a liquid crystal layer sandwiched between electrode-forming surfaces of the two transparent substrates and a retarder disposed on one of the surfaces of the liquid crystal panel, the retarder including a transparent support substrate, a first prism layer including a plurality of microprisms arranged on one of main surfaces of the transparent support substrate, each of the microprisms having a sloped prism face formed at the same slope angle with respect to the one main surface in the same direction, an optical anisotropic medium layer disposed on the other main surface of the transparent support substrate so that an optic axis of the optical anisotropic medium layer is directed in one of a direction of the maximum sloped prism face of the microprisms and a direction perpendicular to the direction of the maximum sloped prism face, and a second prism layer including a plurality of microprisms arranged on the optical anisotropic medium layer, the microprisms having sloped prism faces parallel to each other, and wherein the retarder is disposed so that the optic axis of the optical anisotropic medium layer is directed in one of the pre-tilt direction of liquid crystal molecules of the liquid crystal layer and a direction perpendicular to the pre-tilt direction.

* * * * *